United States Patent
Ha et al.

(10) Patent No.: US 12,540,816 B2
(45) Date of Patent: Feb. 3, 2026

(54) METHOD FOR SHAPE SENSING AN OPTICAL FIBER

(71) Applicant: KATHOLIEKE UNIVERSITEIT LEUVEN, Leuven (BE)

(72) Inventors: Xuan Thao Ha, Leuven (BE); Mouloud Ourak, Leuven (BE); Gianni Borghesan, Sint-Pieters-Woluwe (BE); Emmanuel Vander Poorten, Mechelen (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 187 days.

(21) Appl. No.: 18/258,994

(22) PCT Filed: Dec. 23, 2021

(86) PCT No.: PCT/EP2021/087625
§ 371 (c)(1),
(2) Date: Jun. 22, 2023

(87) PCT Pub. No.: WO2022/136696
PCT Pub. Date: Jun. 30, 2022

(65) Prior Publication Data
US 2024/0060770 A1     Feb. 22, 2024

(30) Foreign Application Priority Data

Dec. 24, 2020  (EP) .................................. 20217278
Dec. 24, 2020  (EP) .................................. 20217292
Jun. 3, 2021   (EP) .................................. 21177637

(51) Int. Cl.
*G01B 11/16*     (2006.01)
*G01B 11/24*     (2006.01)
*G01L 1/24*      (2006.01)

(52) U.S. Cl.
CPC ............ *G01B 11/18* (2013.01); *G01B 11/165* (2013.01); *G01B 11/24* (2013.01); *G01L 1/246* (2013.01)

(58) Field of Classification Search
CPC ....... G01B 11/18; G01B 11/24; G01B 11/161; G01B 21/042; G01B 11/16;
(Continued)

(56) References Cited

U.S. PATENT DOCUMENTS 8,050,523 B2 *  11/2011  Younge ................ A61B 5/6852
                                             385/13
10,314,513 B2 *  6/2019  Blumenkranz ........ A61B 5/065
(Continued)

FOREIGN PATENT DOCUMENTS

EP        3663707 A1 *  6/2020
WO   WO-2010096409 A1 *  8/2010  ............. G01B 11/18
WO      2017139621 A1    8/2017

OTHER PUBLICATIONS

International Search Report and Written Opinion of the International Searching Authority from the European Patent Office, in PCT/EP2021/087625 dated May 4, 2022, which is an international application corresponding to this U.S. application.
(Continued)

*Primary Examiner* — Michael P Stafira
(74) *Attorney, Agent, or Firm* — Kolitch Romano Dascenzo Gates LLC

(57) ABSTRACT

A method for shape sensing an optical fiber embedded within an interventional device includes obtaining, from at least one strain sensor, strain-based shape sensing data of the optical fiber. The strain-based shape sensing data is corrected with a strain correction term. A strain-based reconstructed shape of the optical fiber is calculated based on the corrected data. The strain-based reconstructed shape of the optical fiber is mapped in a coordinate system. The strain
(Continued)

correction term is derived from comparing a previous reconstructed shape of the optical fiber with additional information about the shape obtained from an additional source other than the strain sensor. Following mapping the reconstructed shape in the coordinate system, the method checks for a new set of additional information related to the shape and updates the correction term based on a comparison of the mapped shape with a reconstructed shape based on the new set of information.

18 Claims, 20 Drawing Sheets

(58) Field of Classification Search
CPC .............. G01B 11/2441; G01B 11/002; G01B 9/02004; G01B 9/02027; G01B 11/165; G01B 11/168; G01B 11/00; G01L 1/242; G01L 1/246
See application file for complete search history.

(56) References Cited

U.S. PATENT DOCUMENTS

| | | | |
|---|---|---|---|
| 10,921,117 B2 * | 2/2021 | Froggatt | G01B 11/24 |
| 10,962,351 B2 * | 3/2021 | Roye | G01B 9/02004 |
| 2008/0212082 A1 * | 9/2008 | Froggatt | G01D 5/3539 356/73.1 |
| 2012/0321243 A1 * | 12/2012 | Younge | A61B 1/009 385/13 |
| 2016/0101263 A1 | 4/2016 | Blumenkranz et al. | |

OTHER PUBLICATIONS

Khan, Fouzia, et al.; "Curvature, twist and pose measurements using fiber Bragg gratings in multi-core fiber: A comparative study between helical and straight core fibers" in Sensors and Actuators A: Physical, vol. 317, Jan. 1, 2021.

* cited by examiner

METHOD FOR SHAPE SENSING AN OPTICAL FIBER

TECHNICAL FIELD

The present disclosure relates to the field of surgical techniques and in particular the field of Minimally Invasive Surgery wherein image-guided medical interventions may be performed using shape sensing techniques. More in particular, the present disclosure relates to a method for shape sensing of an optical fiber embedded in at least a portion of an elongated interventional device such as a catheter, a guide wire, a needle, an active cannula, or an endoscope which may be subject to a dynamical twist during operation.

BACKGROUND

Advances in surgical techniques led to Minimally Invasive Surgery (also referred to as "MIS") that allows smaller incisions and typically less post-surgical pain, better surgical outcome and quicker recovery. Examples of MIS involve the use of long and slender instruments that are navigated through veins to reach a desired destination in the cardiovascular system. The downside associated with MIS lies at the increased complexity and difficult manipulation of the instruments.

Instrument navigation is considered a complex task since the interventionalist only has limited information available about the shape of the instrument during the procedure. Today's interventions rely heavily on fluoroscopic imaging to guide the interventionalist. However, fluoroscopy only produces two-dimensional (2D) visualization of the flexible instruments and also exposes both the patient and the interventionalists to harmful X-ray radiation. Due to these disadvantages, medical instrument shape reconstruction based on optical fiber sensing technology has received considerable attention over the past years.

The biocompatibility, compact size, low weight, flexible nature and the property of being free from risk of electrocution make optical fiber-based shape sensing particularly appealing for integration in medical instruments.

Regrettably, due to the high flexibility of the optical fiber, it is subject to dynamical twist, also referred to below as twist, in addition to bending and longitudinal strain. The twist notably reduces the shape sensing's accuracy since an optical strain sensing fiber cannot distinguish between a twist induced strain and a bend induced strain. This ambiguity leads to a significant uncertainty in determining a curvature and bending direction or angle, hence the optical shape sensing of the optical fiber.

Over the years, different methods for optical fiber-based shape sensing have been proposed. The two most common techniques rely on Fiber Bragg Grating (FBGs, also referred to as "gratings" below) and Rayleigh scattering. Each of the proposed approaches has some particular advantageous features, but at the same time also inherits some disadvantageous characteristics as will be briefly explained below.

FBGs are distributed Bragg reflectors and may be disposed in a portion or segment of an optical fiber. FBGs reflect a narrow band spectrum of incoming light while the wavelength belonging to other ranges are lossless transmitted. When multiple FBGs are used, typically each will have its own reflected wavelength. The gratings are fabricated in such a manner that each central wavelength is separated sufficiently far from the other. The reflected light from one grating can therefore be distinguished from the light that is reflected by the other gratings. The reflected spectrum of one grating may change due to temperature variation, mechanical strain and/or torsion (or twist) applied on the optical fiber. An interrogator connected to the optical fiber with FBGs may measure a central wavelength and a possible shift in frequency of this wavelength. Based on the computed wavelength shift, the instantaneous mechanical strain applied on the optical fiber can be estimated.

While FBGs disposed in an optical fiber typically allow a measurement of discrete strains spaced by several centimeters, Rayleigh scattering based techniques are considered truly distributed sensing techniques. The sensing resolution is tunable and can reach values way below one (1) centimeter (cm). Optical Frequency Domain Reflectometry (OFDR) is the main interrogation technology used in conjunction with Rayleigh scattering based techniques.

Both techniques offer a distributed strain sensing method along the optical fiber. Once the strain has been measured, one may use geometric formulas to progressively reconstruct the flexible instrument's shape. Hence, these measured or obtained strain data may also be referred to as strain-based shape sensing data of the optical fiber. Nevertheless, both techniques suffer from the problem that they cannot distinguish between stress induced by (dynamic) twist and/or by bending of the optical fiber during its operation, i.e. when the optical fiber is in use.

Spun multi-core optical fiber allows measuring 3D shape, but to compensate for twist, a twisted spun MCF is needed. A spun MCF is an optical fiber which comprises multiple fiber cores within the same cladding. One core of an optical fiber allows to measure the bending in one direction. It is required that at least one three-core optical fiber or three separate single core optical fibers are employed to sense the three-dimensional (3D) shape of at least a portion of an instrument. If fewer fibers were to be used, combinations with other sensing or modeling methods would be needed to retrieve the three-dimensional (3D) shape. Based on Saint-Venant's Torsion theory, a method was developed to calculate the fiber twist from the longitudinal strain sensed. The use of twisted spun MCFs allows to measure the direction of the twist and can also be designed to increase the twist sensitivity of the MCF. However, the manufacturing process of twisted MCF is challenging because it requires a complicated setup to draw such fibers and spin the MCF precisely. Additionally, the associated fanout (to separate individual cores such that can be interrogated in parallel) and the twisted MCF connector are more costly to make. These disadvantages lead to the fact that twisted MCFs are not widely used right now. Recent work by KAHN, F. et al. Curvature, Twist and Pose Measurements using Fiber Bragg Gratings in Multi-Core Fiber: A Comparative Study between Helical and Straight Core Fibers. *Sensors and Actuators A: Physical*, 2020, 112442 showed that also spun MCFs suffer from twist induced shape estimation errors.

Other state-of-the art works introduced a torsion sensor based on inter-core mode coupling by tapering a multicore seven-core fiber. However, these fibers cannot be employed for shape sensing because of the inhomogeneous nature of the fiber structure due to the tapering.

Despite the various developments in the field of optical fiber-based shape sensing, there is thus still a need in the art for a method and system for shape sensing an optical fiber embedded within at least a portion of an interventional device, which addresses at least some of the issues outlined above, and in particular which addresses the dynamic twist problem that is characteristic for today's shape sensing methods relying on optical fibers.

SUMMARY

It is an object of the present disclosure to provide an accurate method and a system for shape sensing an optical fiber to estimate and compensate the twist applied on the optical fiber and to minimize the error sensing the shape of the optical fiber during its use e.g. in a surgical intervention or any other kind of operation that could benefit from shape information. This objective is accomplished by providing a shape sensing method and system according to the present disclosure.

It is an advantage of embodiments of the present disclosure that an optical fiber may be used with at least one outer fiber core. This means a fiber core that is disposed at a non-zero radial distance from a longitudinal center axis of the optical fiber or from a center axis of the long and slender instrument in which the fiber is embedded and of which the shape is of interest.

It is an advantage of embodiments of the present disclosure that the accuracy of the strain-based reconstructed shape of the optical fiber can be improved during the execution of the procedure or 'in operation' and that it can do so at regular (synchronous) or irregular (asynchronous) or both regular and irregular intervals.

It is an advantage of embodiments of the present disclosure that the method is versatile and can easily be extended to different flexible instruments for interventional purposes such as needles, catheters, guidewires, active cannula, rigid or flexible endoscopes without or with only limited restrictions on the variation of the diameter, or other flexible instruments.

It is a further advantage of embodiments of the present disclosure that the present disclosure is not limited to optical based shape sensing, i.e. it can be applied to other shape sensing methods were the reconstructed shape is derived from distributed strain measurements along the instrument length.

It is a further advantage of embodiments of the present disclosure that the shape sensing can be performed with a limited amount of harmful radiation from other or additional sources. Current image guided surgeries rely heavily on fluoroscopic imaging which potentially causes harm to both patient and interventionalists. The proposed embodiments of the present disclosure make use of additional information on the shape of instrument e.g. fluoroscopy in a limited manner but still be able to estimate and compensate the twist applied on the fiber.

In a first aspect, the present disclosure relates to a method for shape sensing an optical fiber embedded within at least a portion of an interventional device, the optical fiber comprises at least one outer fiber core disposed at a non-zero radial distance from a longitudinal center axis of the optical fiber and/or at a non-zero radial distance from a longitudinal center axis of the interventional device, wherein the at least one outer fiber core is extending along the longitudinal center axis of the optical fiber and having at least one strain sensor adapted to generate strain-based shape sensing data of the optical fiber, the method comprising the steps:
  i. obtaining, from the at least one strain sensor, strain-based shape sensing data of the optical fiber;
  ii. correcting, by a shape sensing system, the strain-based shape sensing data with a strain correction term;
  iii. calculating, by the shape sensing system, a strain-based reconstructed shape of the optical fiber based on the corrected strain-based shape sensing data;
  iv. mapping the strain-based reconstructed shape of the optical fiber in a coordinate system;

wherein the strain correction term is a predetermined strain correction term derived from a step of comparing a previous strain-based reconstructed shape of the optical fiber with additional information related to the shape of the optical fiber obtained from an additional information source other than the at least one strain sensor. It is an advantage of the present disclosure that the method allows to estimate and to compensate a dynamic twist applied on at least a part of the optical fiber to minimize the error in shape sensing the optical fiber during operation. It will be appreciated that even if the fiber is not twisted actively, a certain intrinsic twist may still be present due to the manufacturing process. Also this intrinsic twist can be estimated by the present disclosure. Advantageously, the predetermined strain correction term accounts for twist induced strain in the optical fiber. It is a further advantage of the present disclosure that the accuracy of the strain-based reconstructed shape may be further improved applying this method. It is a further advantage that the strain-based reconstructed shape of the optical fiber may be further improved online using additional information related to the shape of the optical fiber obtained from an additional information source.

Advantageously, the method for shape sensing an optical fiber comprises, following mapping the strain-based reconstructed shape in the coordinate system, checking if a new set of the additional information related to the shape of the optical fiber is available and a step of updating the predetermined strain correction term based on a comparison of the mapped strain-based reconstructed shape of the optical fiber with a reconstructed shape of the optical fiber based on the additional shape information in the coordinate system.

By checking if a new set of the additional information is available for updating the predetermined strain correction term, the rate of determining the strain-based reconstructed shape can be decoupled from the rate of providing the additional information, i.e. the rate of providing the additional information can be selected to be lower than the shape reconstruction rate of the optical fiber. Typically, providing the additional information can be demanding in terms of computing effort or time. The predetermined strain correction term is hence advantageously only updated at the lowest of both rates without affecting or degrading the update rate of the strain-based reconstructed shape of the optical fiber. There may be other reasons why decoupling the two rates is beneficial. By way of example, some additional information sources like fluoroscopic imaging may be harmful to a patient and it may be advantageous to reduce the imaging rate without requiring to reduce the shape reconstruction rate.

Advantageously, if checking whether a new set of the additional information related to the shape of the optical fiber is available reveals that the new set of the additional information is not available, the method comprises performing the steps i.-iv. on the basis of the predetermined strain correction term determined (and utilized) previously, i.e. the predetermined strain correction term is not updated and a previously determined strain correction term is utilized.

Advantageously, the predetermined strain correction term is kept fixed until a new set of the additional information becomes available. Alternatively, the predetermined strain correction term is adjusted on the basis of a metric until a new set of the additional information becomes available. The metric can be derived from a time-analysis of the strain correction term itself to account for possible trends in the strain correction term, e.g. a continuous increase or decrease in time, e.g. the metric can be based on an estimation of the strain correction term based on previous values of the predetermined strain correction term, e.g. as determined based on the additional information.

Advantageously, steps i.-iv. can be repeated at a fixed or variable first time rate. The additional information related to the shape of the optical fiber can be provided at a fixed or variable second time rate, which is advantageously smaller than the first time rate. The second time rate can be a multiple of the first time rate.

According to a preferred embodiment of the present disclosure, the comparison is based on varying the predetermined strain correction term in order to minimize the shape difference between the strain-based reconstructed shape of the optical fiber and the reconstructed shape of the optical fiber based on the additional shape information in the coordinate system.

According to a particular embodiment of the present disclosure, the step of updating the predetermined strain correction term is performed at a predetermined time interval.

According to a particular embodiment of the present disclosure, the method further comprising the step of
selecting the most recent additional information generated by the additional information source;
comparing the mapped strain-based reconstructed shape of the optical fiber with a reconstructed shape of the optical fiber based on the additional shape information in the coordinate system;
updating the predetermined strain correction term based on the comparison.

According to a preferred embodiment of the present disclosure, the comparison between the mapped strain-based reconstructed shape of the optical fiber with a reconstructed shape of the optical fiber based on the additional shape information in the coordinate system, is based on varying the predetermined strain correction term in order to minimize the shape difference between the strain-based reconstructed shape of the optical fiber and the reconstructed shape of the optical fiber based on the additional shape information in the coordinate system.

According to a particular embodiment of the present disclosure, the strain correction term comprises a twist induced strain correction term representing a dynamically variable twist applied on the optical fiber.

According to a particular embodiment of the present disclosure, the optical fiber further comprises a central fiber core disposed along the longitudinal center axis of the optical fiber and having at least one strain sensor adapted to provide strain-based shape sensing data of the optical fiber.

According to a preferred embodiment of the present disclosure, the optical fiber further comprises at least one tracking sensor, in particular an electromagnetic tracking (EMT) sensor, adapted to provide additional information, in particular tracking data, about the position of the optical fiber information in the coordinate system.

According to a particular embodiment of the present disclosure, the strain-based reconstructed shape of the optical fiber is based on bend induced strain data from which a curvature and a bending angle of at least a portion of the optical fiber is derived, wherein the bend induced strain data is corrected by a twist induced strain correction term.

According to a preferred embodiment of the present disclosure, the additional information source is a fluoroscopic image source, a preoperative model computed tomography scan source, a magnetic resonance image source, a kinematic model source, a dynamic model source, an electromagnetic tracking system source, a resistive or a piezoelectric strain-gauge based source or other image derivable shape/pose data source.

According to a particular embodiment of the present disclosure, the at least one strain sensor is selected from the group consisting of an FBG sensor or an impedance strain sensor.

According to a preferred embodiment of the present disclosure, the method further comprises the steps of
determining a calibration relationship between the coordinate system in which the strain-based reconstructed shape of the optical fiber is mapped and a coordinate system from the additional data source; and
mapping the additional information from the additional data source in the coordinate system using the calibration relationship.

In a second aspect of the present disclosure, there is provided a shape sensing system comprising configured to perform a method for shape sensing an optical fiber embedded within at least a portion of an interventional device according to a previous aspect of the present disclosure, wherein the optical fiber comprises at least one outer fiber core disposed at a non-zero radial distance from a longitudinal center axis of the optical fiber and/or at a non-zero radial distance from a longitudinal center axis of the interventional device, wherein the at least one outer fiber core is extending along the longitudinal center axis of the optical fiber, and wherein the at least one outer fiber core has at least one strain sensor adapted to generate strain-based shape sensing data of the optical fiber, the shape sensing system comprising: a strain measuring unit in communication with the optical fiber and configured to obtain, from the at least one strain sensor, strain-based shape sensing data of the optical fiber; a data processing and memory unit in communication with the strain measuring unit and configured to at least correct the strain-based shape sensing data with a strain correction term, calculate a strain-based reconstructed shape of the optical fiber based on the corrected strain-based shape sensing data; and map the strain-based reconstructed shape of the optical fiber in a coordinate system; and an additional information source in communication with the data processing and memory unit; wherein the strain correction term is a predetermined strain correction term derived from a step of comparing a previous strain-based reconstructed shape of the optical fiber with additional information related to the shape of the optical fiber obtained from the additional information source other than the at least one strain sensor.

Advantageously, the shape sensing system is integrated in an interventional device. The interventional device can further comprise an elongate body, such as a catheter, having a longitudinal center axis, and an optical fiber embedded within at least a portion of the elongate body.

According to a third aspect of the present disclosure, there is provided a use of a shape sensing system for shape sensing an optical fiber embedded within at least a portion of an interventional device according to a previous aspect of the present disclosure.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

Although there has been constant improvement, change and evolution of methods and systems in this field, the present concepts are believed to represent substantial new and novel improvements, including departures from prior practices, resulting in the provision of more efficient, stable and reliable methods and systems of this nature.

The above and other characteristics, features and advantages of the present disclosure will become apparent from the following detailed description, taken in conjunction with the accompanying drawings, which illustrate, by way of example, the principles of the present disclosure. This description is given for the sake of example only, without limiting the scope of the present disclosure. The reference figures quoted below refer to the attached drawings.

BRIEF DESCRIPTION OF THE DRAWINGS

FIG. 11b illustrates the distance between each corresponding point at a given arc length l along the fiber in the first and the second configuration of FIG. 11a;

FIG. 18b shows analysis results of evaluation metrics comparing reconstruction errors when using EMT and FBG data and the proposed framework (i.e. EMT, FBG and fluoroscopy) for the experiment of FIG. 18a.

DETAILED DESCRIPTION

Figure 1:
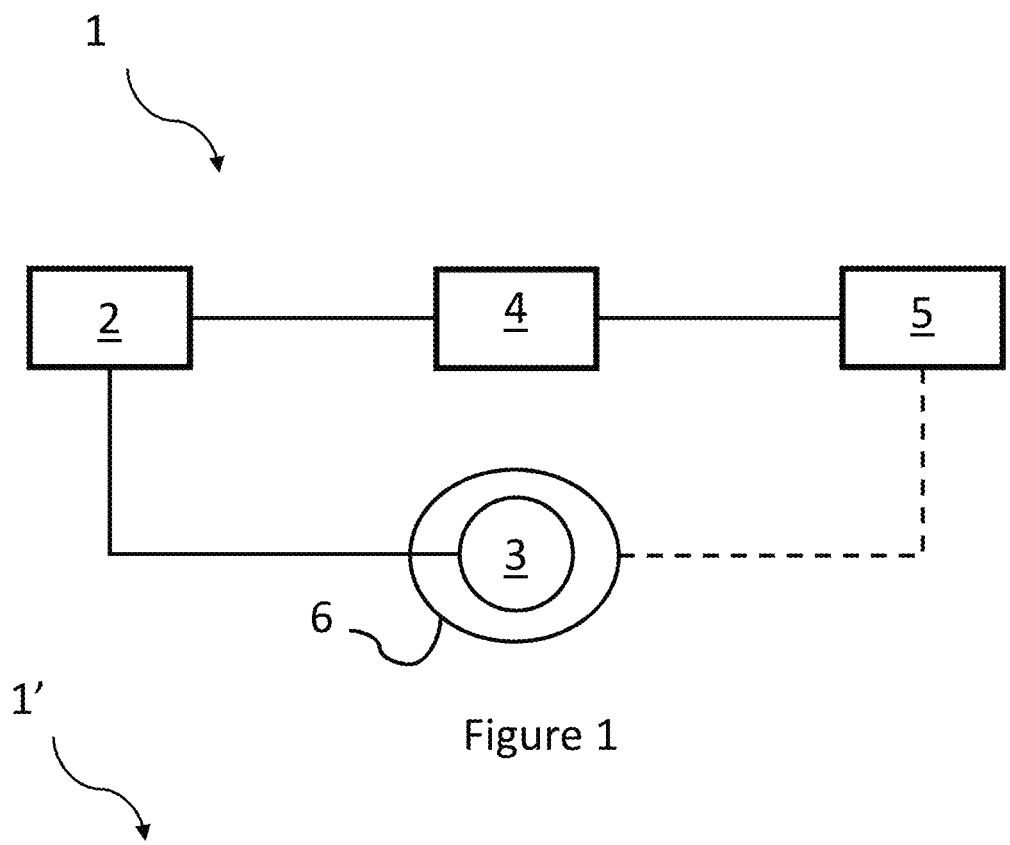
FIG. 1 shows a schematic block diagram of a shape sensing system for shape sensing an optical fiber embedded within at least a portion of an interventional device according to embodiments of the present disclosure.

The present disclosure will be described with respect to particular embodiments and with reference to certain drawings, but the present disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the present disclosure.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the present disclosure described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable with their antonyms under appropriate circumstances and that the embodiments of the present disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present disclosure, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the present disclosure, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the present disclosure, and form different embodiments, as would be understood by those in the art. For example, in the following claims, any of the claimed embodiments can be used in any combination.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

As used herein, and unless otherwise specified, a dynamic twist or twist on the optical fiber may be considered as a measure or result of a force or torque acting on the optical fiber that is causing the optical fiber, or at least a portion of it, to twist. This twisting may lead to a twist induced strain which may not directly be distinguished from a bending induced strain.

As used herein, and unless otherwise specified, when reference is made to an outer fiber core of an optical fiber, reference may be made to a straight outer fiber core or a helical outer fiber core, without being limited thereto, wherein a straight outer fiber core is disposed substantially parallel to a longitudinal center axis of the optical fiber, and wherein a helical outer fiber core is helically wrapped around the longitudinal center axis of the optical fiber.

FIG. 1 shows a schematic block diagram of a shape sensing system 1 for shape sensing an optical fiber 3 embedded within at least a portion of an interventional device 6 according to embodiments of the present disclosure. The optical fiber 3 comprises at least one outer fiber core (not illustrated in FIG. 1) disposed at a radial distance from a longitudinal center axis of the optical fiber 3. The at least one outer fiber core of the optical fiber 3 extends along the longitudinal axis of the optical fiber 3 and comprises at least one strain sensor adapted to generate strain-based shape sensing data of the optical fiber 3.

The shape sensing system 1 further comprises a strain measuring unit 2 connected to the optical fiber 3 and adapted to obtain or generate from the at least one strain sensor disposed in the optical fiber 3 along its longitudinal axis, strain-based shape sensing data of the optical fiber 3. According to embodiments of the present disclosure, a strain measuring unit 2 may be an interrogator connected to the optical fiber. The at least one strain sensor may be a Fiber Bragg Grating (FBG) sensor such that the strain measuring unit 2 or interrogator measures a central wavelength and a possible shift in frequency of this wavelength from which a strain measurement or strain-based shape sensing data may be derived. The strain measuring unit 2 may also be adapted to obtain or generate Rayleigh scattering based signals or data using Optical Frequency Domain Reflectometry (OFDR). While using FBG sensors disposed in an optical fiber 3 typically allow a measurement of discrete strains spaced by several centimeters, Rayleigh scattering based techniques are considered truly distributed sensing techniques. The sensing resolution is tunable and can reach values way below one (1) centimeter (cm). OFDR may be considered as the main interrogation technology used in conjunction with Rayleigh scattering based techniques. On the other hand, while OFDR provides high spatial resolution, FBG sensor-based interrogation methods are comparatively cheaper. Typically, they also have higher signal to noise ratio (SNR).

The shape sensing system 1 further comprises a data processing and memory unit 4 connected to the strain measuring unit 2 and at least one additional information source 5 other than the at least strain sensor. According to embodiments of the present disclosure, the strain measuring unit 2 may be embedded within the data processing and memory unit 4 in which the at least one strain sensor may be connected to the data processing and memory unit 4. This has the advantage of having a more compact and easier to move and/or more portable shape sensing system 1.

The data processing and memory unit 4 is configured with instructions to store the strain-based shape sensing data of the optical fiber 3 and to correct this data with a strain correction term, wherein the strain correction term is stored in the data processing and memory unit 4. The data processing and memory unit 4 is further configured to calculate a strain-based reconstructed shape of the optical fiber 3 within the interventional instrument 6, and to map the strain-based reconstructed shape of the optical fiber 3 in a coordinate system. The data processing and memory unit 4 may further comprise or may be connected to a display having a user interface to display the mapped reconstructed shape.

The shape sensing system 1 may further comprise at least one additional information source adapted to provide additional information related to the shape of the optical fiber 3. The additional information source is connected to the data processing and memory unit 4 and is adapted to send and receive instructions from this unit 4. According to embodiments of the present disclosure, the additional information source 5 may be a fluoroscopic image source, a preoperative model computed tomography scan source, a magnetic resonance image source, a kinematic model source, a dynamic model source, an electromagnetic tracking system source, a resistive or piezoelectric strain-gage based source or other image derivable shape/pose data source, configured to provide additional information on the shape of the optical fiber 3.

Figure 2:
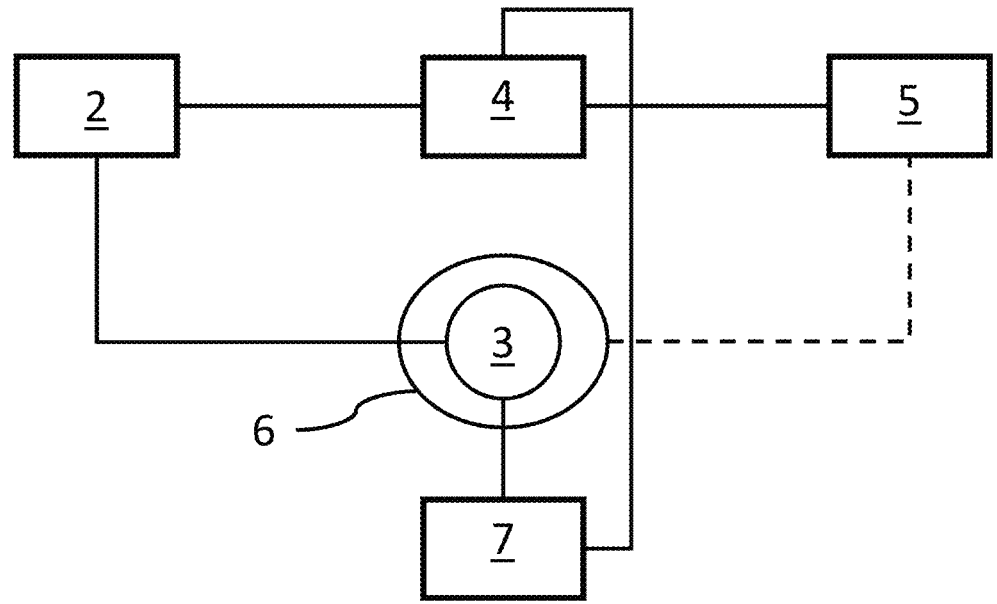
FIG. 2 shows a schematic block diagram of a shape sensing system for shape sensing an optical fiber embedded within at least a portion of an interventional device according to embodiments of the present disclosure.

Referring to FIG. 2 there is illustrated a schematic block diagram of a shape sensing system 1' for shape sensing an optical fiber 3 embedded within at least a portion of an interventional device 6 according to embodiments of the present disclosure. In addition to FIG. 1, the shape sensing system 1' further comprises a position tracking unit 7 connected to at least one tracking sensor disposed in the optical fiber 3. According to preferred embodiments of the present disclosure, this tracking sensor may be an Electromagnetic Tracking (EMT) sensor. The position tracking unit 7 may be connected to the data processing and memory unit 4 to send and receive data, signals and instructions.

Figure 3:
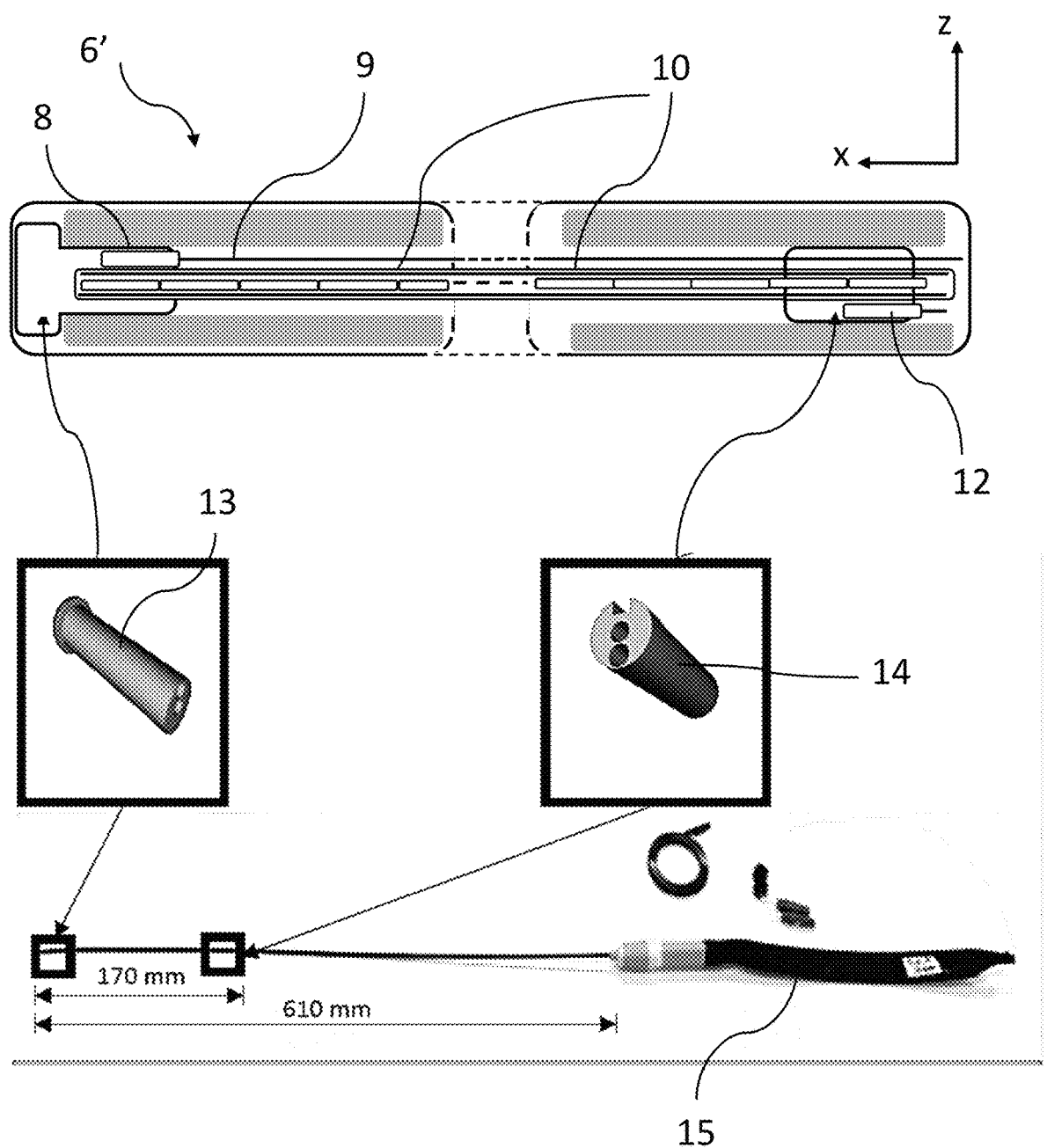
FIG. 3 depicts a schematic view of an optical fiber embedded within at least a portion of an interventional device according to embodiments of the present disclosure, and in particular a multicore optical fiber embedded within a first portion of a catheter.

Referring to FIG. 3 there is depicted a schematic view of an optical fiber embedded within at least a portion of an interventional device 6' according to embodiments of the present disclosure, and in particular a multicore optical fiber 10 embedded within a first portion of a catheter sheath 15. The lower part of FIG. 3 shows a picture of the catheter sheath 15, whereas the upper part of FIG. 3 shows a cross-section in the xz-plane of at least a portion of the front end of the catheter comprising the optical fiber. The first portion is defined by a tip fixture 13 and a base fixture 14. Between the tip fixture 13 and the base fixture 14 according a longitudinal axis of the device 6', the following feature may be identified: a tip EMT sensor 8 connected to a position tracking unit (not shown) using an EMT sensor connection means 9; a multicore optical fiber 10 which extends further than the base fixture 14; at least one grating connected to a strain sensor measuring unit (not shown) adapted to generate strain-based shape sensing data; and a base EMT sensor 12. According to embodiments of the present disclosure, an optical fiber may also be provided without EMT sensors.

Figure 4:
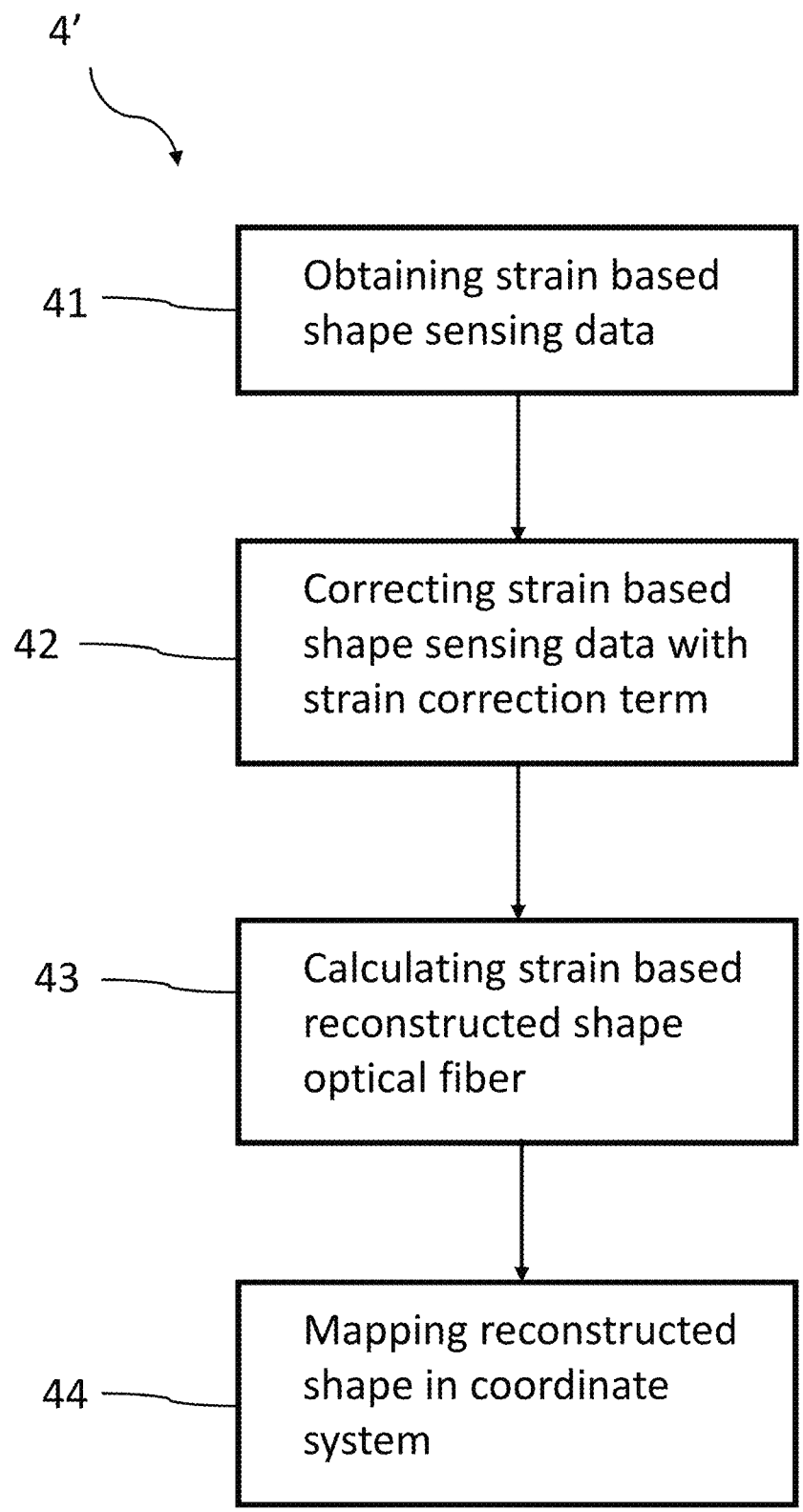
FIG. 4 shows a flowchart of a method for shape sensing an optical fiber embedded within at least a portion of an interventional device according to embodiments of the present disclosure.

Referring to FIG. 4 there is demonstrated a flowchart 4' of a method for shape sensing an optical fiber embedded within at least a portion of an interventional device according to embodiments of the present disclosure. The method may be performed using a shape sensing system 1, 1', wherein the shape sensing system 1, 1' is configured to perform the step of obtaining 41, from the at least one strain sensor, strain-based shape sensing data of the optical fiber; correcting 42, by a shape sensing system, the strain-based shape sensing data with a strain correction term; calculating 43, by the shape sensing system, a strain-based reconstructed shape of the optical fiber based on the corrected strain-based shape sensing data; and mapping 44 the strain-based reconstructed shape of the optical fiber in a coordinate system. The strain correction term is a predetermined strain correction term derived from a step of comparing a previous strain-based reconstructed shape of the optical fiber with additional information related to the shape of the optical fiber obtained from an additional information source other than the at least one strain sensor.

Figure 5:
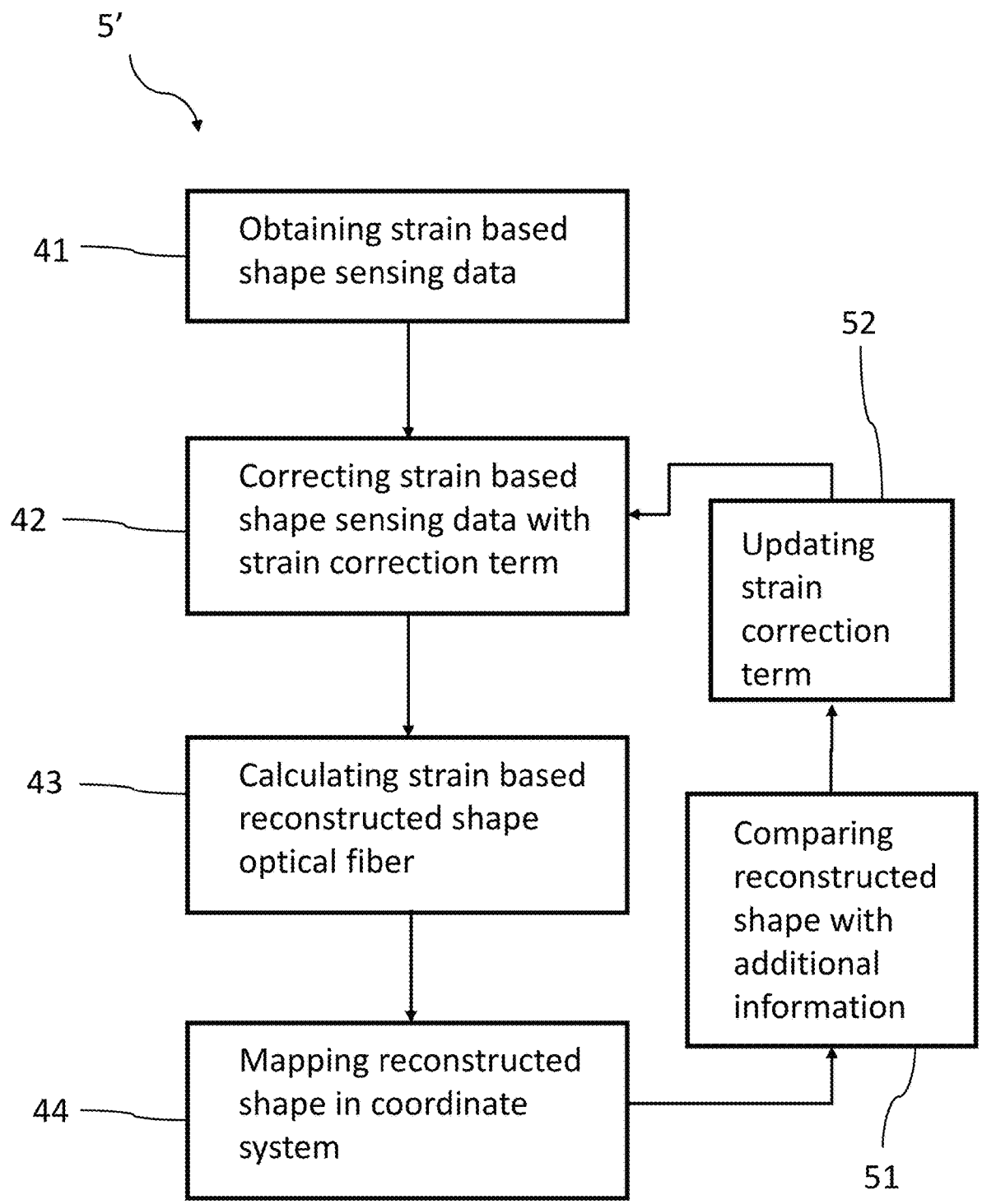
FIG. 5 shows a flowchart diagram for shape sensing an optical fiber according to embodiments of the present disclosure.

FIG. 5 shows a flowchart diagram 5' according to embodiments of the present disclosure, using a shape sensing system 1, 1', further comprising a step of updating 52 the predetermined strain correction term based on a comparison 51 between the mapped strain-based reconstructed shape of the optical fiber with a reconstructed shape of the optical fiber based on the additional shape information in the coordinate system. In embodiments of the present disclosure, this comparison 51 may be based on varying the predetermined strain correction term in order to minimize the shape difference between the strain-based reconstructed shape of the optical fiber and the reconstructed shape of the optical fiber based on the additional shape information in the coordinate system. Other embodiments may be based on varying the predetermined strain correction term in order to minimize the shape difference between the strain-based reconstructed shape of the optical fiber and a set of reconstructed shapes of the optical fiber based on either prior optimizations or different additional sets offering shape information in the coordinate system or any other convenient combination thereof.

According to specific embodiments of the present disclosure, the at least strain sensor 11 disposed on the at least one outer fiber core of an optical fiber 3 may be an FBG sensor. The obtained strain-based shape sensing data 41 may be subject to temperature variations and/or to longitudinal strain which will cause a wavelength shift in the Bragg wavelength $\lambda_B$, i.e. the wavelength of the light that is reflected back from an FBG sensor. The change in strain measured from the wavelength shift can be mechanical strain $\varepsilon_{Mech}$ and/or temperature change induced strain $\varepsilon_{Temp}$, depending on the nature of the variation or change. The relationship between the wavelength shift of the Bragg wavelength and strain can be expressed as in equation (1) below $$\frac{\lambda_B - \lambda_{B_0}}{\lambda_{B_0}} = \frac{\Delta \lambda_B}{S_\varepsilon \lambda_{B_0}} = \varepsilon_{Mech} + \varepsilon_{Temp} \tag{1}$$

wherein $\varepsilon_{Mech}$ can be expressed as $$\varepsilon_{Mech} = \varepsilon_{Bend} + \varepsilon_{Twist} + \varepsilon_{Axial} \tag{2}$$

and wherein $\lambda_{B_0}$ is the grating's unstrained Bragg wavelength, $S_\varepsilon$ is the strain sensitivity coefficient, $\varepsilon_{Bend}$ is the bend induced strain, $\varepsilon_{Twist}$ is the twist induced strain, and $\varepsilon_{Axial}$ is the axial loading induced strain.

The measured and obtained strain-based shape sensing data 41 may define a distribution of measurements at discrete locations along the longitudinal center axis of the optical fiber in embodiments wherein the strain sensors are disposed at discrete locations, corresponding to different fixed values of the arc length "s" that runs from a low value at one side of the catheter to a higher value at the other side of the catheter, along the longitudinal center axis of the optical fiber. According to some embodiments of the present disclosure, the distribution of measurements from strain sensors that are disposed at discrete locations at a radial offset from the longitudinal center axis of the optical fiber or at a radial offset from the longitudinal axis of a long and slender instrument. According to some embodiments of the present disclosure, the distribution of measurements may be a discrete distribution of a set of strain measurements. In some implementations of the present disclosure, the distribution may be a continuous distribution.

An optical fiber used in embodiments of the present disclosure can be studied as a substantially homogenous cylinder adapted for optical transmission, and the at least one outer fiber core and the central fiber core are covered with cladding, e.g. a catheter sheath 16. The cross-sectional shape of the optical fiber may generally be circular, i.e. the section where the optical fiber is cut off in a plane XY that is perpendicular to the longitudinal axis of the optical fiber or the instrument axis. Assuming that the optical fiber has perfectly elastic behavior, plane sections remain plane, radii remain straight and cross sections remain plane and circular, Saint-Venant's Torsion theory can be applied for the optical fiber. Thereby, the strain sensor is in a state of pure shear and twist induced strain $\varepsilon_{Twist}$ in an element of the sensor may be expressed as:

$$\varepsilon_{Twist} = r \frac{d\tau}{ds} \quad (3)$$

where r is the radial distance of the element from the neutral line and $$\frac{d\tau}{ds}$$

is the rate of change of the angle of twisting per variation of arc length s., the twist induced strain $\varepsilon_{Twist}$ may vary linearly with r. Hence, the twist induced strain $\varepsilon_{Twist}$ is proportional to the radial distance. So at the longitudinal center axis of the optical fiber, the twist is zero and at each outer fiber core (which is assumed to be at the same distance from the neutral line) it is thus a given value (equal for each outer core at a given s).

According to embodiments of the present disclosure, this optical fiber may comprise a center fiber core in addition to the at least one outer fiber core wherein the central fiber core is located at the longitudinal center axis and the non-central fiber core are disposed at a radial distance from the longitudinal center axis. An optical fiber comprising at least one non-central fiber core and a central fiber core is referred to as a multicore (or multi-core) optical fiber.

Figure 6:
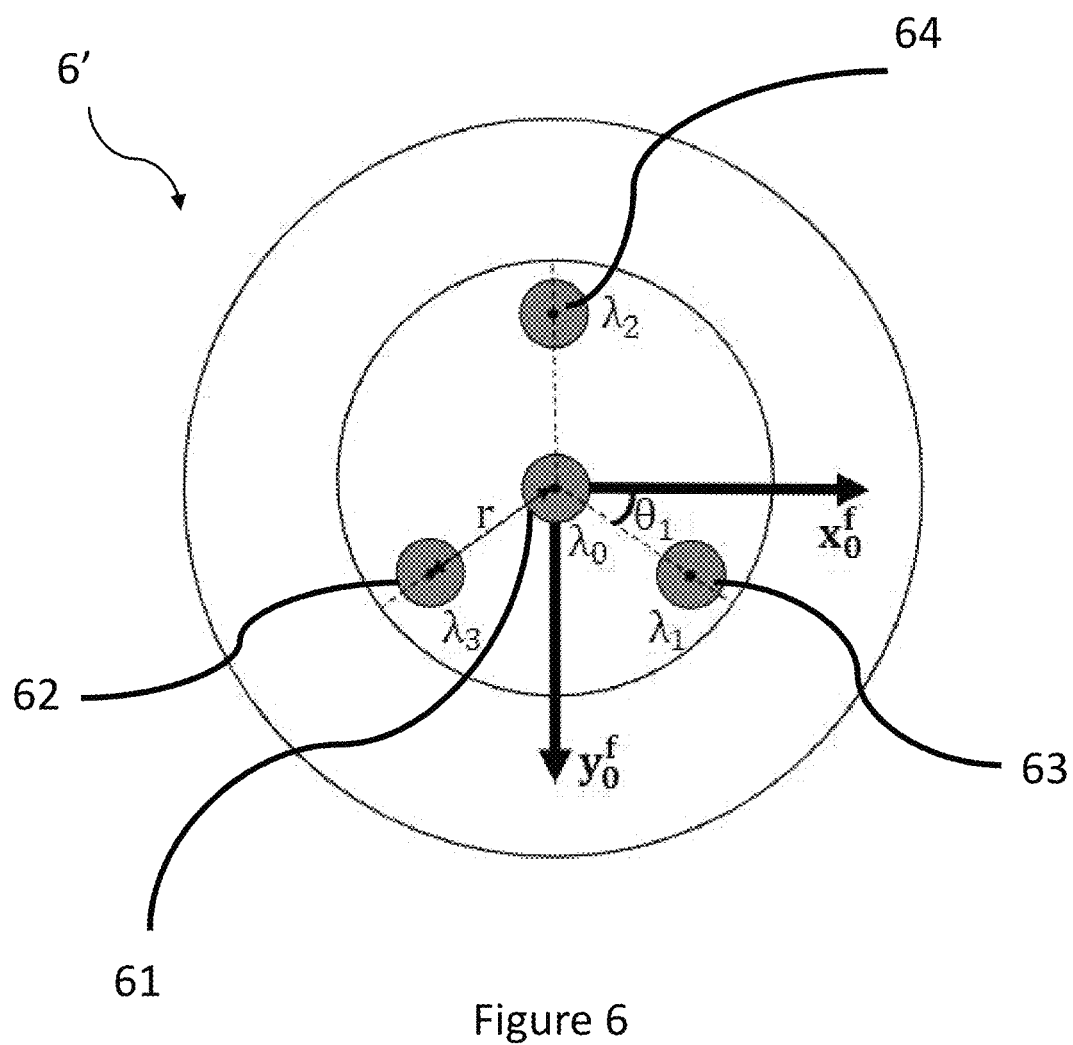
FIG. 6 illustrates a cross-sectional view upon a multicore optical fiber adapted to use in embodiments according to the present disclosure, comprising one center fiber core and three outer fiber cores.

Referring to FIG. 6 and according to a preferred embodiment of the present disclosure, there is illustrated a multicore optical fiber 6' comprising one center fiber core 61 and three outer fiber cores 62, 63, 64 which are disposed at a radial distance r from the center fiber core. The measured strain signals, data or distribution $\varepsilon_0$ obtained from the center fiber core 61 are only sensitive to temperature and axial loading induced strains and can be eliminated from measured strain signals, data or distribution $\varepsilon_1$, $\varepsilon_2$, $\varepsilon_3$ obtained from the shifted wavelength on the surrounding outer fiber cores 62, 63, 64. Since the center core 61 is only sensitive to temperature induced strain and axial loading induced strain, the strain $\varepsilon_0$ measured from the center fiber core 61 and the strain $\varepsilon_1$, $\varepsilon_2$, $\varepsilon_3$ measured from the outer fiber cores 62, 63, 64 measured from the first, second and third outer fiber core respectively, can be expressed as in equations (4), (5) and (6):

$$\varepsilon_0 = \varepsilon_{Temp} + \varepsilon_{Axial} \quad (4)$$

$$\varepsilon_{i \in \{1,2,3\}} = \varepsilon_{Bend,i} + \varepsilon_{Twist} + \varepsilon_{Temp} + \varepsilon_{Axial} \quad (5)$$

$$\varepsilon_{Bend,i} = -\kappa r \cos\left(\theta_b - \frac{3\pi}{2} - \theta_i\right) \quad (6)$$

where the parameter r is the distance from the outer fiber core 62, 63, 64 to the center fiber core 61, the bending angle $\theta_i$ is the angle of the $i^{th}$ outer core fiber with respect to the x-axis, and $\kappa$ is the curvature. For example, $\theta_i$ could be $-30°$, $90°$ and $210°$ in embodiments according to the present disclosure having four fiber cores of which one is a center fiber core 61 without being restricted to these values. Referring to FIG. 6, the bending angle $\theta_1$ of the first outer fiber core 63 with respect to the x-axis is indicated. The bend induced strain of the $i^{th}$ outer core is indicated as $\varepsilon_{Bend,i}$.

Traditionally, under the assumption that the optical fiber is inserted in a torsionally stiff element, e.g. a catheter made of torsionally stiff elements, that prevents torsion during the procedure, the twist induced strain $\varepsilon_{Twist}$ is assumed to be zero and and the strain measurements of the outer fiber core $\varepsilon_{i \in \{1,2,3\}}$ and the strain measurements of the center fiber core $\varepsilon_0$ are used to compute the curvature $\kappa$ and the direction of the bending plane $\theta_b$ of the optical fiber according to Equation (4) to (6). However, in practice, it is not evident at all to completely avoid torsion. Given that even small amounts of twist may have a large impact on the overall reconstructed shape accuracy, twist is considered one of the main challenges that give rise to significant errors on both the derived curvature $\kappa$ and direction of the bending plane $\theta_b$ from strain measurements.

According to embodiments of the present disclosure, after obtaining strain-based shape sensing data, the method may comprise a step of interpolating the measured bend induced strains $\varepsilon_{Bend,i}$ to find the missing bend induced strain at points where there is no presence of a strain sensor, for example an FBG sensor. The set of interpolated bend induced strain is then used to solve for curvature $\kappa$ and direction of the bending plane $\theta_b$, also referred to as bend angle $\theta_b$ at discrete point along the optical fiber length. From the set of derived curvature $\kappa$ and direction of the bending plane $\theta_b$, a strain-based reconstructed shape of the optical fiber can be obtained.

Figure 7:
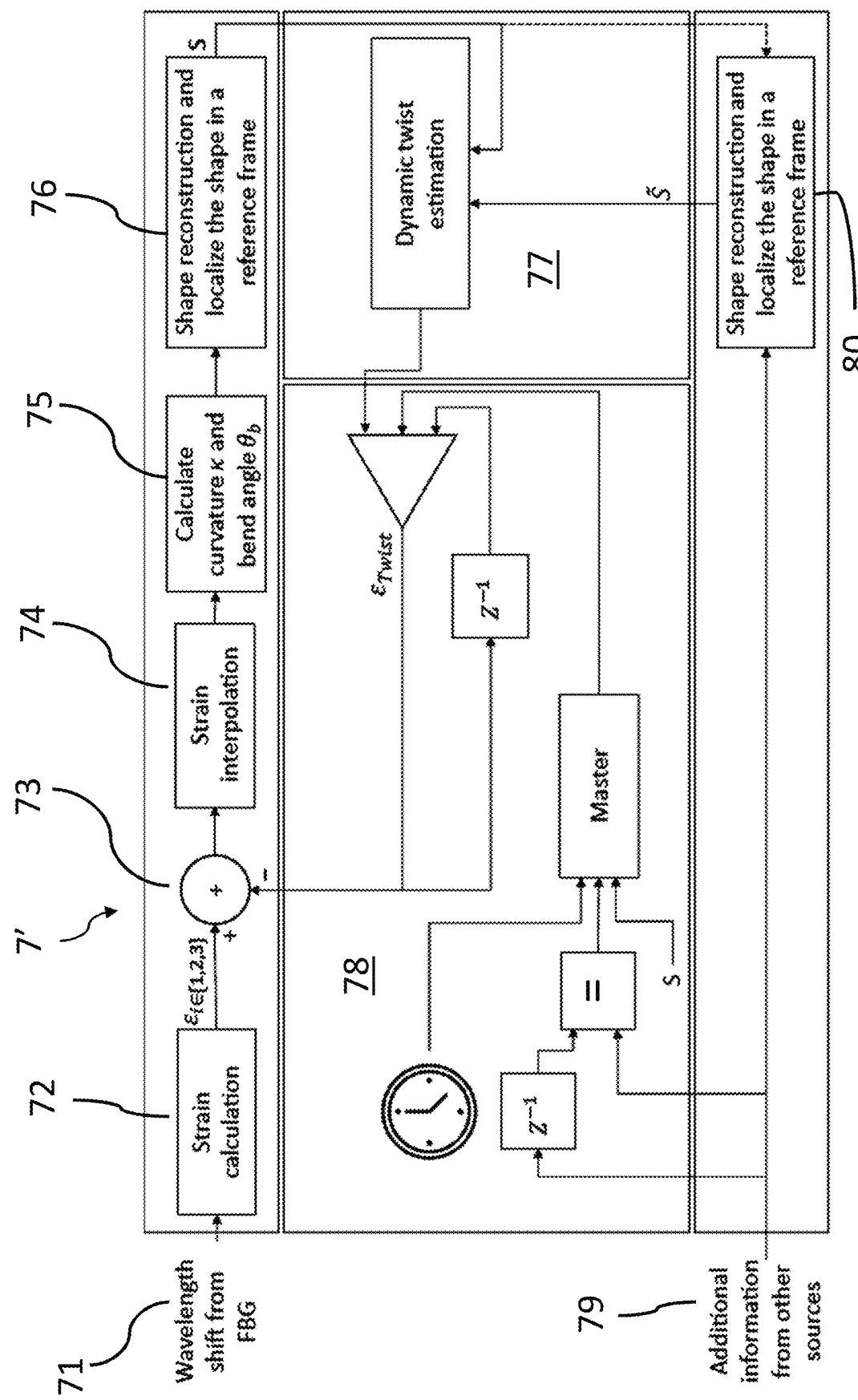
FIG. 7 shows a flowchart diagram for shape sensing an optical fiber according to embodiments of the present disclosure.

Embodiments of the present disclosure may be applied to compensate for a twist induced strain caused by dynamic twist applied on the optical fiber, wherein the optical fiber is embedded in an interventional device. This is illustrated in FIG. 7 which is a schematic flowchart diagram 7' for a method for shape sensing an optical fiber embedded within at least a portion of an interventional device, wherein the strain correction term comprises a twist induced strain correction term representing a dynamically variable twist applied on the optical fiber. In order to obtain, from at least one strain sensor, strain-based shape sensing data of the optical fiber, a first step 71 may be the measurement of wavelength shift from at least one FBG sensor to calculate strain 72. From the wavelength shift measurement, strain-based shape sensing data 73 like a strain distribution may be derived. The strain distribution may be interpolated 74 in case of a discrete strain distribution for obtain a strain distribution along the longitudinal axis of the optical fiber. From the obtained 72, 73 or interpolated 74 strain distribution, the curvature κ and direction of the bending plane $\theta_b$ along the optical fiber can be derived 75. Under the assumption that there is no twist present and that the optical fiber comprises at least two fiber cores, the 3D shape of the optical fiber can be reconstructed and mapped in a coordinate system 76. It should be understood that when reference is made to mapping the strain-based reconstructed shape of the optical fiber in a coordinate system, reference may also be made to a step of localizing the reconstructing shape in a reference frame.

However, twist cannot always be prevented from occurring in practice. Twist can occur when an external torsional moment is applied or alternatively it may arise when a bending torque is applied, but the torsional rigidity of the structure is not uniform. During bending of the interventional device comprising the optical fiber, the strain on the optical fiber and in particular the at least one outer fiber core can then be affected by not only a bend induced strain, a temperature variation induced strain, an axial loading induced strain but also a twist induced strain which requires to be estimated 77 and corrected for 78.

Instead of neglecting the twist induced strain as in known shape sensing methods, embodiments of the present disclosure incorporate a step of correcting the strain-based shape sensing data with a strain correction term, wherein the strain correction term may comprise a twist induced strain correction term $\varepsilon_{Twist}$. This twist induced strain correction term $\varepsilon_{Twist}$ is used by correcting the strain-based shape sensing data with the strain correction term in order to calculate a bend induced strain from which the curvature κ and direction of the bending plane $\theta_b$ along the optical fiber can be derived 75.

According to embodiments of the present disclosure, this twist induced strain correction term $\varepsilon_{Twist}$, also referred to as twist induced strain distribution, takes into account the effect of dynamically variable twist applied on the optical fiber during operation. Since the twist induced strain correction term $\varepsilon_{Twist}$ is part of the strain correction term, the twist induced strain correction term $\varepsilon_{Twist}$ may be a predetermined twist induced strain correction term derived from a step of comparing a previous strain-based reconstructed shape of the optical fiber with additional information related to the shape of the optical fiber obtained from an additional information source other than the at least one strain sensor. In case this information is not available, the twist induced strain correction term may be equal to zero and updated during further steps according to embodiments of the present disclosure.

Referring to the steps 71 to 76, a bend induced strain of an outer fiber core of the optical fiber can be defined as $$\varepsilon_{i \in \{1 \ldots n\}} = \varepsilon_i - \varepsilon_{Twist} - \varepsilon_0 \qquad (7)$$

Wherein n represents the number of outer fiber cores, $\varepsilon_i$ the obtained strain-based shape sensing data of an outer fiber core and $\varepsilon_0$ the obtained strain-based shape sensing data of the center fiber core. From Equations (4), (5), (6) and (7), the bend induced strain may then be calculated and used to solve for the curvature κ and direction of the bending plane $\theta_b$, and a reconstructed shape of the optical fiber can be obtained in the strain measuring system reference frame 76.

According to embodiments of the present disclosure, the twist induced strain correction term $\varepsilon_{Twist}$ may be set to zero and updated whenever a more or less reliable information on the shape of the optical fiber is available, wherein the more or less reliable information on the shape of the optical fiber is obtained from an additional information source other than the at least one strain sensor and adapted to provide additional information related to the shape of the optical fiber.

Step 71 in FIG. 7 is not limited to wavelength shift measurements or data from FBG sensors. According to embodiments of the present disclosure, strain-based shape sensing data may also be obtained from, without being limited thereto, Rayleigh scattering or impedance based data, or a combination.

According to embodiments of the present disclosure, the method may also be applied to optical fibers comprising a center core fiber that is not sliding perfectly within its housing but that undergoes a certain amount of friction such that the twist is not exactly zero in the longitudinal center or neutral axis, but elsewhere. In this case, the steps of subtracting the measured strain of the center fiber core $\varepsilon_0$ to compensate for the temperature variation and axial loading induced strain in the at least one outer fiber core (cf. Equation (4) to (7)), makes the calculated bend induced strain of the outer fiber core contain a common offset from the real values. Hence, the strain correction term is not limited to a twist induced strain correction term $\varepsilon_{Twist}$, and can be used to estimate and compensate for any common offset that is added to the bend induced strain of the surrounding non-central cores.

Referring to FIG. 7, step 79 provides additional information related to the shape of the optical fiber obtained from an additional information source other than the at least one strain sensor. The additional information source may be an image of the interventional device (fluoroscopy), preoperative model (Computed Tomography (CT) scan, Magnetic Resonance Imaging (MRI)), e.g. providing a pre-operative model of the anatomy, catheter shape estimated from kinematic or dynamic model, electromagnetic tracking (EMT) system, a resistive or piezoelectric system or any other means of sensor or other model. A kinematic model may be used to describe the motion or shape of elongated interventional devices. Typical kinematic models are for example models based on Denavit Hartenberg (DH) notation, constant curvature models or spline-based models. These models relate input parameters such as displacements of prismatic or rotational joints, of steering cables, driving bar, tendons to geometric motion or shape. Additionally, continuity and/or smoothness constraints may be incorporated in this type of models. In general, kinematic models describe the motion or shape of a device without a relation to the effort (such as force, torque, power) that is responsible for it. In contrast, a dynamic model, which may be quasi-static in case the responsible driving force, torque, power does not alter fast over time, typically produces estimates of the motion or shape of a structure, such as an interventional device, based on knowledge of the driving force (or similar) behind it. Most commonly constitutive (dynamic) equations that capture material, longitudinal, bending or torsional stiffness/compliance are used, possibly supplemented with information relating to one or more of: inertial, damping, Coriolis, gravitational effects or external forces and moments. These dynamic equations are solved to derive information on the device's shape or motion. Examples of dynamic models that often rely on beam theory include models based on Ludwick beam theory, Euler-Bernoulli or Cosserat rod theory. Both kinematic and dynamic models can comprise or rely on data-driven models such as artificial neural networks and deep-learning methods to approximate the behavior by learning from a set of experimental (training) data. Any one of these models can serve as additional information to help solve the twist-induced strain and correction terms.

The additional information does not necessarily need to be more reliable compared to the strain sensing method. It can be less reliable or equally reliable as long as it possess some extra complementary information on the shape of the optical fiber. The more precise this information is, the more weight could be assigned to this additional information. The additional information may also simply used as a safety measure to signal a warning signal if discrepancies are noticed with the strain sensing method. The additional information related to the shape of the optical fiber can be mapped 80 in the coordinate system of the mapped strain-based reconstructed shape of the optical fiber, requiring a step of calibrating a coordinate system of the additional information source with the coordinate system wherein the strain-based reconstructed shape of the optical fiber is mapped 76.

According to embodiments of the present disclosure, the calibration comprises the steps of determining a calibration relationship between the coordinate system wherein the strain-based reconstructed shape is mapped and a coordinate system from the additional data source, and mapping the additional information from the additional data source in the coordinate system using the calibration relationship. These calibration steps may be carried out in advance which has the advantage of mapping the additional shape information from the additional information source to the coordinate system of the reconstructed strain-based shape of the optical fiber. Since the method for shape sensing according to embodiments of the present disclosure provides the strain-based reconstructed shape in an arbitrary reference system, embodiments of the present disclosure may also provide steps to locate the reconstructed shape in a fixed coordinate system which allow to track not only the reconstructed shape but also the position of the optical fiber embedded in the interventional instrument, hence the position of the interventional instrument. Locating the reconstructed strain-based shape of the optical fiber in a fixed coordinate system and carrying out the calibration process to determine a calibration relationship between both coordinate systems, wherein the calibration relationship is stored in the shape sensing system as described before, has the advantage of reducing the processing time of the method for shape sensing including a step of correcting with a strain correction term, according to embodiments of the present disclosure.

According to embodiments of the present disclosure, a relationship between the coordinate systems may be obtained by an automatic registration method which has the advantage to exclude manual registration steps to establish a registration between the coordinate system where the strain-based reconstructed shape is mapped in and a second coordinate system in which the additional data source is expressed.

As mentioned before, the strain correction term is a predetermined strain correction term derived from a step of comparing a previous strain-based reconstructed shape of the optical fiber with additional information related to the shape of the optical fiber obtained from an additional information source other than the at least one strain sensor. The comparison may be based on varying a predetermined strain correction term in order to minimize the shape difference between the strain-based reconstructed shape of the optical fiber and the reconstructed shape of the optical fiber based on the additional shape information in the coordinate system. Hence, a twist induced strain correction term may be calculated by finding an optimal value that alters the reconstructed shape so that it maximally corresponds to the additional information derived from the other source. This updated twist induced strain correction term may then be used throughout the current and upcoming method steps for shape sensing the optical fiber until more recent or more accurate information on the shape of the optical fiber is available.

Figure 8:
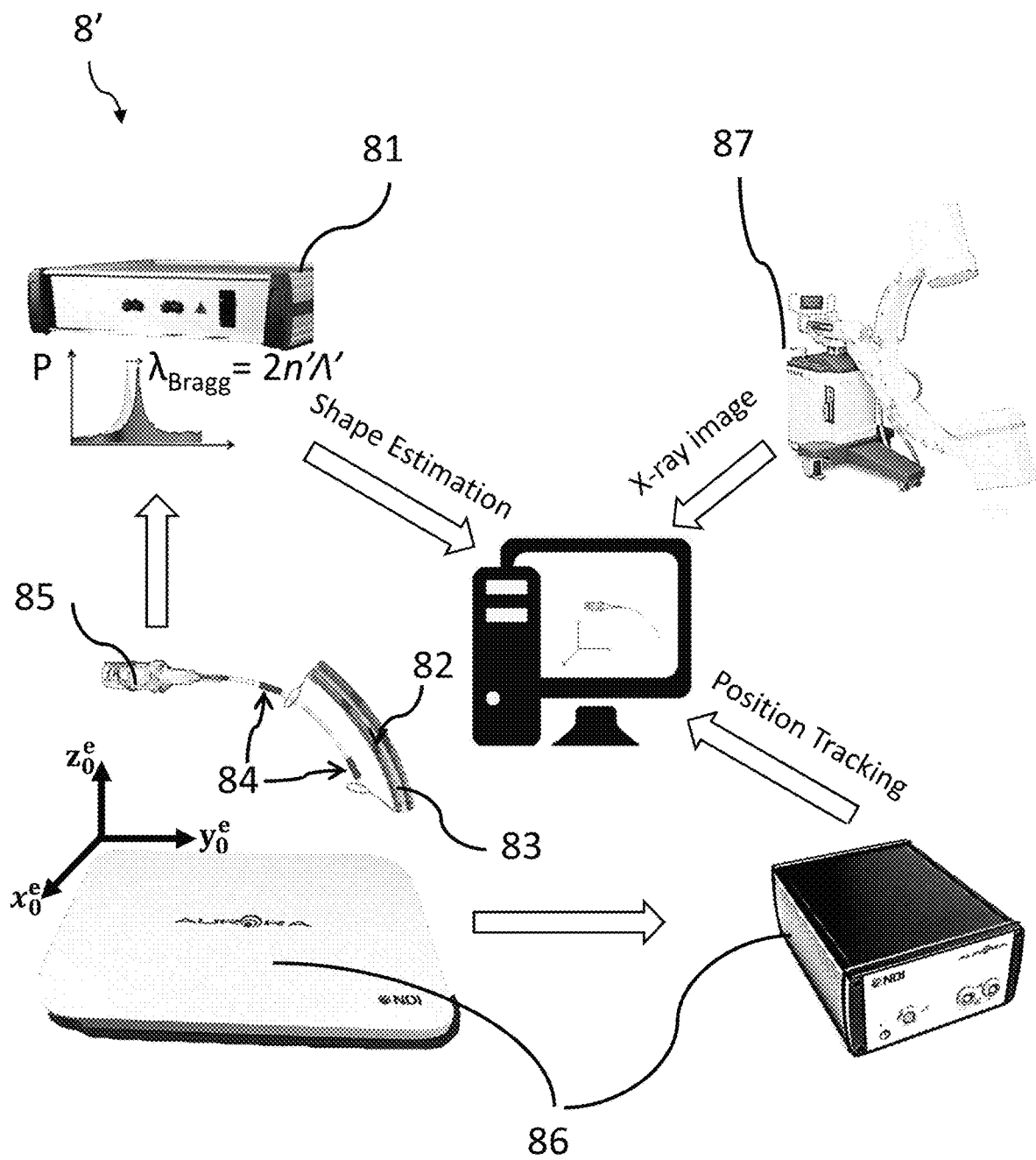
FIG. 8 depicts a platform design for performing a method according to embodiments of the present disclosure.
Figure 9:
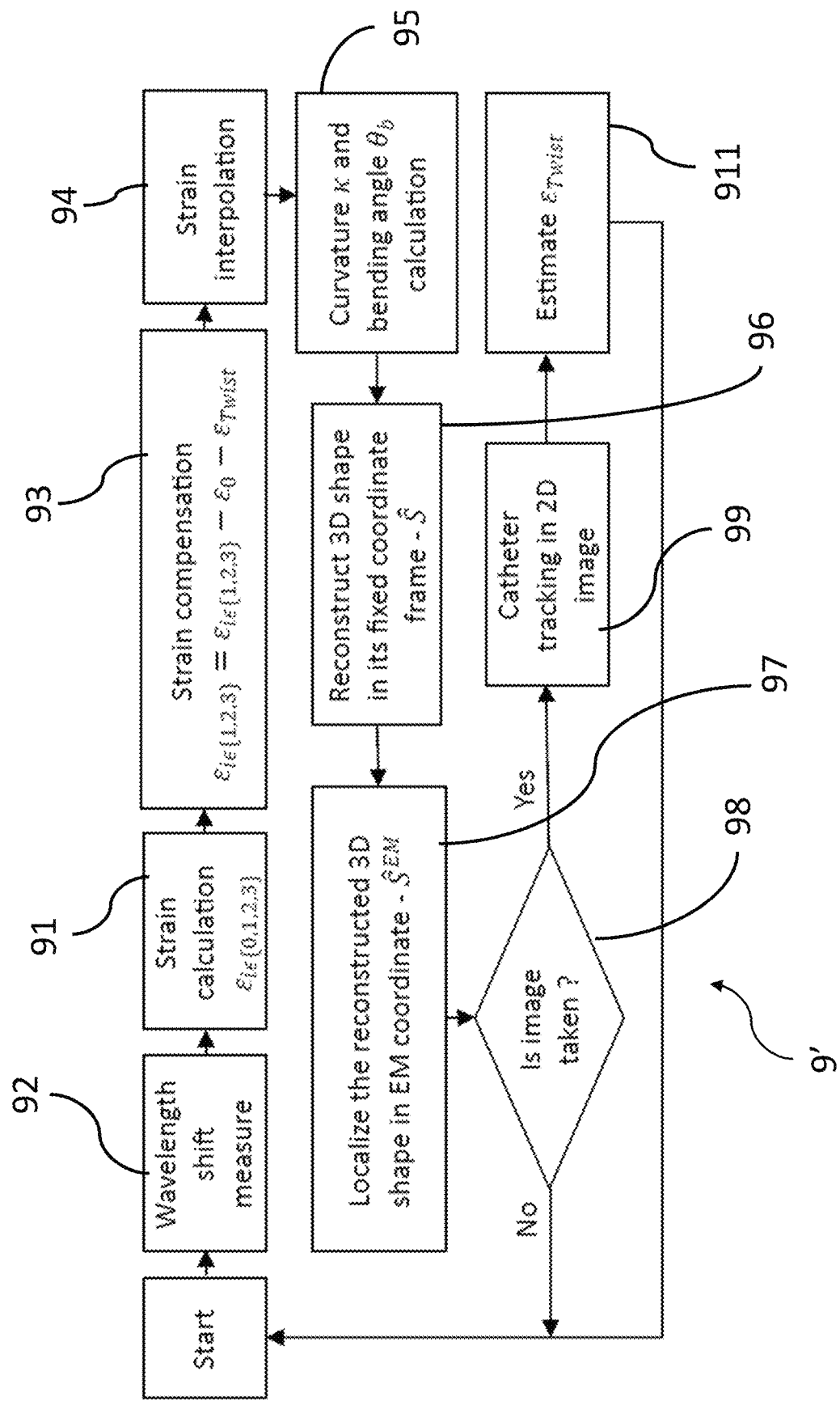
FIG. 9 shows a schematic flowchart diagram according to a specific embodiment of the present disclosure.

An example of the present disclosure is described by referring to a platform design as depicted in FIG. 8 and a schematic flowchart diagram as shown in FIG. 9 according to a method for shape sensing an optical fiber embedded in a catheter, wherein an example of the catheter is described in relation to FIG. 3.

The platform design 8' comprises an interrogator 81 adapted for measuring strains from the at least one FBG sensor 82 disposed in an optical fiber 83 embedded within at least a portion of a catheter 85, a guiding sheath with EMT sensors 84 integrated in the optical fiber 83 of the catheter 85, a table-top NDI Aurora EMT system 86 and a fluoroscopic system 87. An 8.5 F Destino bi-directional steerable guiding sheath was prepared with two embedded six degrees-of-freedom (6 DOF) NDI Aurora EMT sensors 84. A first EMT sensor is approximately located at five (5) millimetres (mm) from the catheter tip. The second EMT sensor is placed at 170 mm from the tip sensor. The physical length of an 6 DOF EMT sensor is 0.8 mm times 0.9 mm. A 250 µm four-core fiber consisting of seventy-two (72) FBG sensors 82 is integrated in the catheter. Each core contains eighteen (18) FBG sensors distributed 10 mm apart from each other. Each FBG sensor grating has a different center wavelength. The length of each FBG sensor is four (4) mm. For the position of the two EMT sensors reference is made to FIG. 3.

An advantage of embodiments of the present disclosure, which may become clear from this description, is the online estimation of a twist induced strain induced by a dynamic twist and the compensation for this dynamic twist by subtracting a twist induced strain correction term from the measured strains, also referred to as strain-based shape sensing data of the optical fiber.

Referring to FIG. 9 there is depicted a schematic flowchart diagram according to an example of the present disclosure, wherein a platform as shown in FIG. 8 may be used. A strain distribution $\varepsilon_{i \in \{1,2,3\}}$ along the non-central or outer cores is obtained 91 by measuring 92 a wavelength shift along at the outer or non-center fiber cores, wherein i=1 refers to a first outer fiber core, i=2 refers to a second outer fiber core and i=3 refers to a third outer fiber core. These outer fiber cores are disposed at a radial distance from the longitudinal center axis of the optical fiber.

In a next step 93, the measured strains $\varepsilon_{i \in \{1,2,3\}}$ are updated by subtracting a strain correction term, also referred to as strain correction distribution, wherein the strain correction term may comprise a measured strain of the center fiber core $\varepsilon_0$ and twist induced strain correction term $\varepsilon_{Twist}$. The twist induced strain correction term $\varepsilon_{Twist}$ may be a predetermined term based on the comparison between a previous strain-based reconstructed shape of the optical fiber with additional information related to the shape of the optical fiber obtained from an additional information source other than the strain sensors.

The twist induced strain correction term $\varepsilon_{Twist}$ may also be a predetermined term defined by a user of the shape sensing system or may be equal to zero. This may be the case when the method for shape sensing an optical fiber is performed for this first time and a comparison between a previous strain-based reconstructed shape of the optical fiber with additional information related to the shape of the optical fiber obtained from an additional information source other than the strain sensors could not be performed yet.

According to the next steps 94, 95, 96 of this example as depicted in FIG. 9, the corrected strain-based shape sensing data are interpolated 94 and used to reconstructed 96 a three-dimensional (3D) shape of the catheter 85 comprising the optical fiber 83. The 3D strain-based reconstructed shape of the optical fiber may be obtained by deriving 95 a set or a plurality of curvature $\kappa$ measurements and a set of or a plurality of direction of a bending plane $\theta_b$ measurements.

Thereafter, the strain-based reconstructed 3D shape of the optical fiber embedded in the catheter may be localized 97 in the EMT coordinate system. This may be done by incorporating the information from the two EMT sensors 84. Once the strain-based reconstructed shape is localized, the shape sensing system is configured to check 98 if additional shape information, for example a fluoroscopic image of the instrument, obtained by an additional information source is already taken. According to embodiments of the present disclosure, the additional information source may be an imaging system further comprising an image processing unit configured to generate fluoroscopic images of a target volume of the flexible instrument using an iterative or analytic image generation methods.

In case there is a new fluoroscopic image available, the strain-based reconstructed shape of the optical fiber as obtained in step 96 and mapped in a coordinate system as performed in step 97, is then compared with the fluoroscopic 2D image of the optical fiber or catheter in order to estimate 911 and, if required, update the used twist induced strain correction term. This updated twist induced strain correction term may then be used throughout a following shape sensing method according to embodiments of the present disclosure.

In case the test of step 98 reveals that no new fluoroscopic image has been taken (no new additional information is available), a new cycle of method steps 92 through 97 can be performed, in which the twist induced strain correction term $\varepsilon_{Twist}$ of the previous cycle is used, i.e. the twist induced strain correction term $\varepsilon_{Twist}$ determined the last time step 911 was performed. Alternatively, a metric can be applied to adjust $\varepsilon_{Twist}$ until step 911 can be performed again. By way of example, $\varepsilon_{Twist}$ can be estimated (extrapolated) based on the values determined some or all previously executed steps 911.

The comparison between the strain-based reconstructed shape of the optical fiber and the additional shape data obtained from an additional data source, may be performed by solving an optimization problem. The dynamic twist induced strain correction term may then be found as the value or distribution that makes the reconstructed shape maximally correspond to the shape detected in the 2D fluoroscopic image or of different of those shapes that are obtained after averaging or filtering of a plurality of such images.

The next paragraphs further explain in detail the previous steps.

Referring to steps 91 and 92 in FIG. 9, the strain is calculated based on wavelength shift measurement as measured from the FBG sensors. Hence, the reconstructed shape 96 may be considered as an FBG strain-based reconstructed shape wherein the wavelength shift measurement is measured by a shape sensing system or optical device system, as depicted in FIGS. 1 and 2. Once the FBG based shape reconstruction method has been carried out 93, 94, 95, a reconstructed shape may be obtained 96. At this point, this reconstructed shape is relative to the first FBG sensor. To determine where this first FBG sensor and the remaining shape lie in space, a co-registration with EMT could be conducted 97.

Figure 10A:
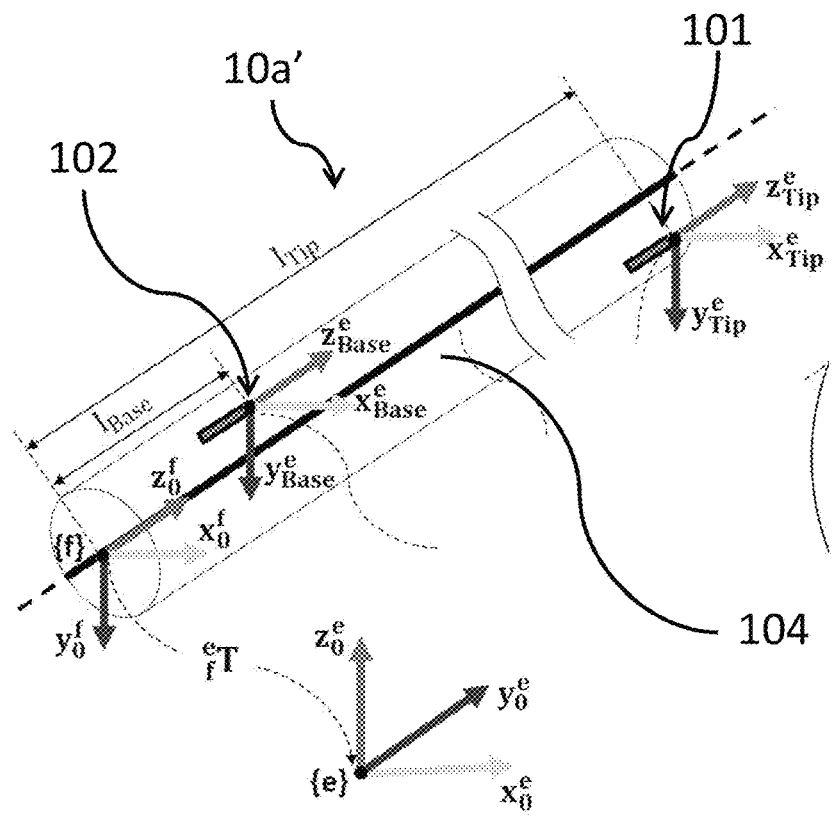
FIG. 10a and FIG. 10b depict respectively a multicore optical fiber and a cross-sectional view upon a multicore optical fiber adapted to be used in embodiments according to the present disclosure.
Figure 10B:
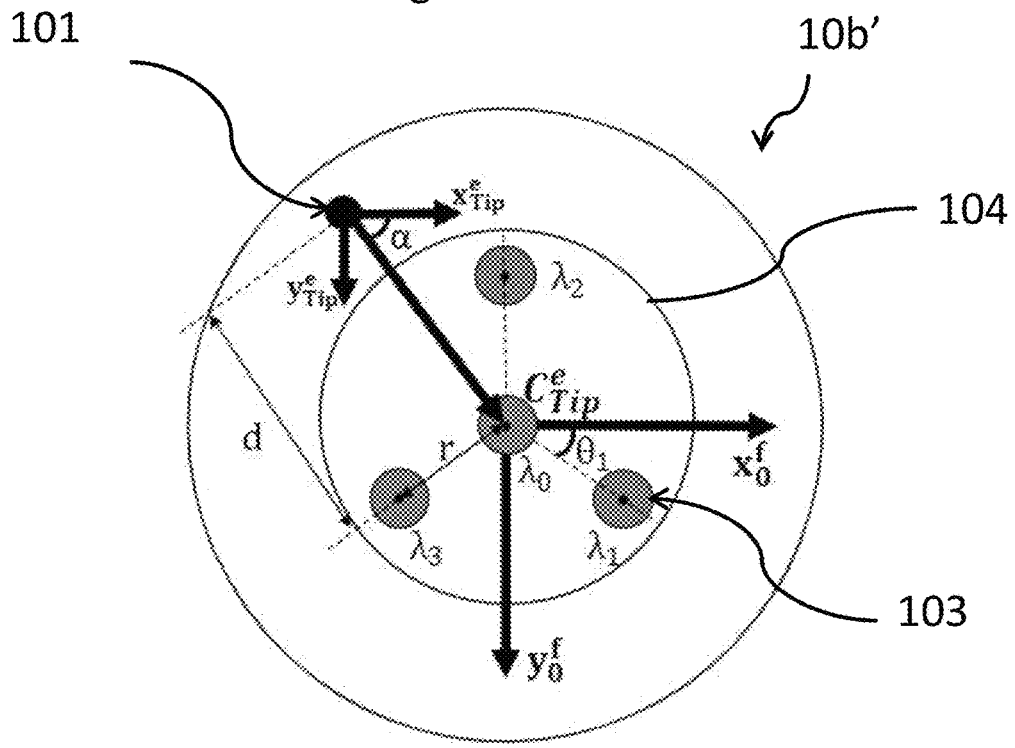

Referring to FIG. 10a and FIG. 10b, the pose of each EMT sensor 101, 102 in the EMT coordinate frame {e} may be defined as $$T^e = \begin{bmatrix} R^e_{3\times 3} & P^e_{3\times 1} \\ 0_{1\times 3} & 1 \end{bmatrix} \quad (8)$$

wherein $R_{3\times 3}^e=[x^e y^e z^e]$ is a 3×3 rotation matrix and $P_{3\times 1}^e$ describes the current position of the EMT sensor 101, 102. Both are expressed relative to an EMT coordinate frame {e} that is fixed to the EMT generator (that serves as base reference in this embodiment). The relationship between the different coordinate frames is shown in FIG. 10a and FIG. 10b. The strain-based 3D reconstructed shape of the optical fiber in reference frame {f} fixedly attached to the first outer fiber core 103 at a first FBG sensor may be expressed as a set of n points $S^f=[s_1 s_2 \ldots s_n]$ where $s_i$ is the coordinate of each point together with a set of tangent vectors $V^f=[v_1 v_2 \ldots v_n]$ where $v_i$ is the tangent vector at points $s_i$. A spatial calibration step needs to be carried out to find the correspondence between the measured shape $S^f$ and the measured pose $T^e$ of the base 102 and tip 101 EMT sensors. For this spatial calibration step, a method may be applied that uses only the strain-based reconstructed shape from the FBG sensors together with the poses from two EMT sensors 101, 102 to conduct co-registration. This has the advantage that no CT scans and optical markers with a point-based registration algorithm to align the reconstructed shape $S^f$ to the segmented catheter shape in the CT have to be used.

Figure 11A:
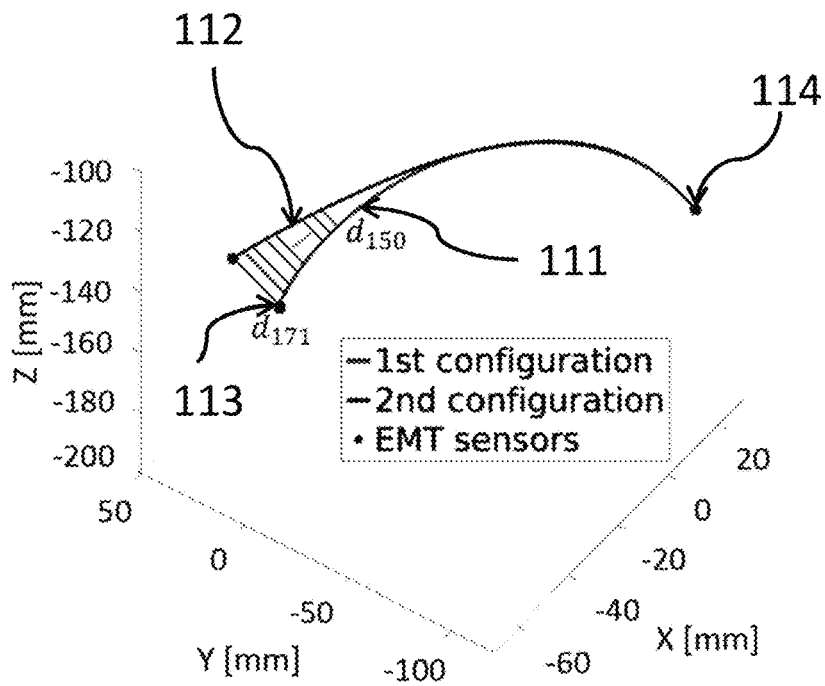
FIG. 11a shows a 3D reconstructed shape of two configurations according to embodiments of the present disclosure.
Figure 11B:
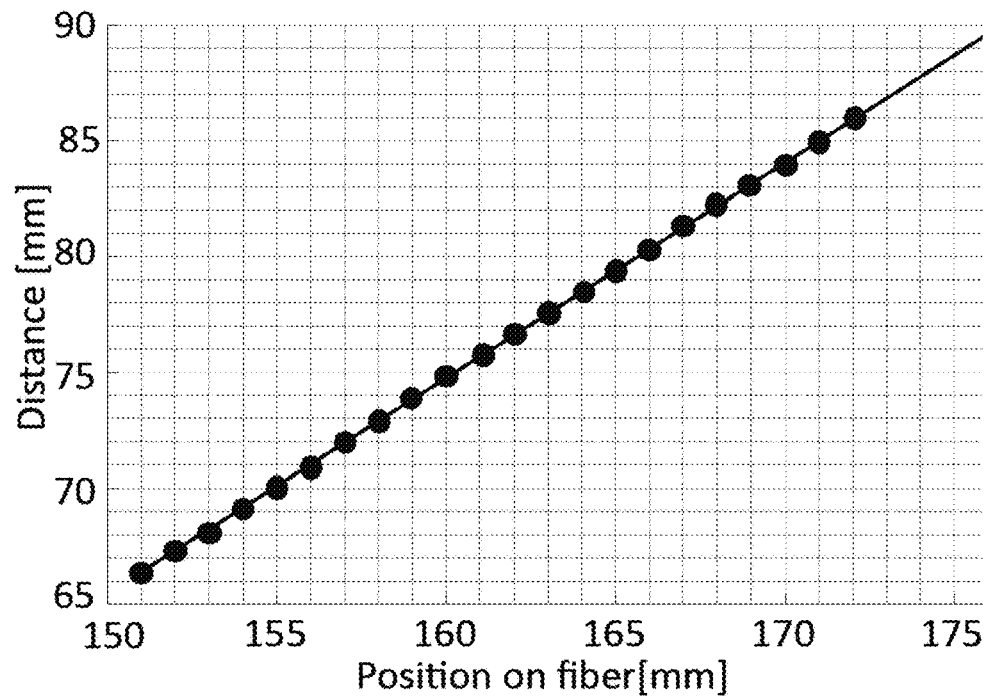

For this co-registration, the catheter with two EMT sensors 101, 102 and multicore optical fiber 104 is temporally fixed at the base at the level of the proximal EMT sensor and is subsequently bent on a planar plate in two configurations, wherein the configuration should be symmetric relative to the straight configuration as shown in FIG. 11a and FIG. 11b.

FIG. 11a shows a 3D reconstructed shape of two configurations, i.e. a first configuration 111 and a second configuration 112, in a fixed coordinate system of the FBG sensors. FIG. 11b shows the distance between each corresponding point at a given arc length l along the fiber in the first 111 and the second 112 configuration, as indicated in FIG. 11b and further explained below.

Since embodiments of this invention provide a strain-based 3D reconstructed shape of the optical fiber, hence catheter comprising the optical fiber, the distance between each corresponding point at a given arc length l along the optical fiber 104 can be measured. This distance can be set out for each point along the length of the optical fiber 104. Also, the Euclidean distance between the tip EMT sensor 113 pose can be calculated in the two configurations. By comparing the traveled EMT distance with the interpolated distance traveled by the optical fiber, the corresponding arc length $l_{Tip}$ can be determined of the tip EMT sensor 113 relative to the FBG sensor. The distance between the tip 113 and the base 114 EMT sensor can be measured in a second step by putting the optical fiber straight on the plane and subtracting the poses measured by the EMT sensors 113, 114. From the tip position of the optical fiber in the straight configuration, the arc length $l_{Tip}$ and the space between two EMT sensors 113, 114, the arc length of the base EMT sensor relative to {f}, $l_{Base}$ can then be estimated.

Note that while, without loss of generality, assuming that the EMT sensors are aligned parallel to the catheter center line, the EMT sensors are not collinear to that center line. Therefore, for each EMT sensor j, where j can be base or tip EMT sensor, a calibration step is needed to find the transformation matrix $T_{Calib}$ to transform the relative position of this EMT sensor to the center line as expressed in Equation (9):

$$\begin{bmatrix} S^e \\ 1 \end{bmatrix} T_{Calib} \begin{bmatrix} P^e \\ 1 \end{bmatrix} \quad (9)$$

where $$R_{Calib} = R^e \text{Rot}_z(a) = [x_{Calib} y_{Calib} z_{Calib}] \quad (10)$$

which gives $x_{Calib}$ that is used to find the transformation $$T_{Calib} = \begin{bmatrix} I_{3\times3} & dx_{Calib} \\ 0 & 1 \end{bmatrix} \quad (11)$$

To estimate $T_{Calib}$, the catheter may be held in a straight configuration and can then be rotated about its axis. For this purpose for example a straight 3D printed tube was made with an inner diameter of 4.1 mm (same as the outer diameter of the catheter sheath). The tube was then fixed on top of the EMT field generator. The catheter sheath was inserted into the 3D tube and rotated to make sure pure rotation was achieved. The position measurements $p^e$ from each EMT sensor will follow ideally a form close to a circle with center $C^e$. The angle $\alpha$ is the angle between the x-axis of the EMT sensor and the vector from $p^e$ to $s^e$. d is the distance to the center line. The relationship between these parameters can be seen in FIG. 10a and FIG. 10b. An optimization problem may then be formulated to find a and d e.g. by minimizing the following energy function $$\text{argmin}_{d_j, \alpha_j} \frac{1}{n} \sum_{i=1}^{n} (p_{ij}^e - s_{ij}^e) j \in \{\text{Base, Tip}\} \quad (12)$$

where n is the number of position samples gathered during rotating the catheter around its axis for each EMT sensor. Note that also embodiments whereby the EMT sensors are not parallel to the catheter center line can be solved and employed in other preferred embodiments of the presented invention.

To localize the position of the catheter's shape reconstructed by the FBG sensors in the EMT coordinate frame, four shape points in the fixed shape sensing coordinate frame relative to the first strain sensor {f}:

$$N^f = \{s_{Base}^f, s_{Base}^f + v_{Base}^f, s_{Tip}^f, s_{Tip}^f + v_{Tip}^f\} \quad (13)$$

together with their corresponding points in the EMT frame {e}:

$$N^e = \{s_{Base}^e, s_{Base}^e + v_{Base}^e, s_{Tip}^e, s_{Tip}^e + v_{Tip}^e\} \quad (14)$$

can be used to e.g. localize the catheter shape $S^e$ in the EMT frame. A rigid transformation matrix $_f^e T$ to transform the catheter shape in the fixed shape sensing coordinate frame to the EMT coordinate frame can then be calculated by determining the registration between the two frames:

$$S^e = _f^e T S^f \quad (15)$$

The reconstruction of strain-based shape of an optical fiber, or if this optical fiber is embedded within at least a portion of an interventional device like a catheter, the reconstruction of the catheter shape uses, according to embodiments of the present disclosure, a B-spline curve to limit the shape space and decrease the high dimensionality. This model-based catheter representation also makes the shape detection in a 2D image plane, for example when the additional information source is a fluoroscopic image source, more robust and able to deal with noise and missing measurements (e.g. part of the catheter is occluded). The standard basis function representation of a B-spline curve of degree k—1 is given by Equation (16)

$$b(t) = \Sigma_{i=1}^n C_i B_{i,k}(t) \quad (16)$$

where $C_i \in \mathbb{R}^N$ are the n control points and $B_{i,k}(t)$ are basis functions which can be derived by the De Boor-Cox recursive formula. According to embodiments of the present disclosure, a 3D (N=3) cubic open B-splines with degree 3 (k=4) which are $\mathbb{C}^2$ continuously differentiable functions. For a cubic B-spline curve with four control points [$C_{i-1}$, $C_i$, $C_{i+1}$, $C_{i+2}$], the local cubic B-spline can be defined as:

$$b_i(t) = \frac{1}{6}[t^3 t^2 t^1 t^0] \begin{bmatrix} -1 & 3 & -3 & 1 \\ 3 & -6 & 3 & 0 \\ -3 & 0 & 3 & 0 \\ 1 & 4 & 1 & 0 \end{bmatrix} \begin{bmatrix} C_{i-1} \\ C_i \\ C_{i+1} \\ C_{i+2} \end{bmatrix} \quad (17)$$

The sampling parameter $t \in [0, 1]$ is uniformly distributed for point interpolation. For point interpolation, a clamped cubic B-spline has $C_{j \in -2, \ldots, n+3}$ and at the boundary $C_i = C_{j<1}$ and $C_n = C_{j<n}$. Instead of fitting the B-spline curve to a number of control points. The knot-driven B-spline representation is used to have a better local control in order to perform optimization for region-based pixel-wise posterior. Given a set of knot points $K_i$, the control points for clamped cubic B-spline can be found by:

$$\begin{bmatrix} C_1 \\ \vdots \\ C_n \end{bmatrix} = \begin{pmatrix} 1 & \cdots & \cdots & \cdots & \cdots & \cdots & 0 \\ \frac{1}{6} & \frac{2}{3} & \frac{1}{6} & \ddots & \ddots & \ddots & \vdots \\ \vdots & \ddots & \ddots & \ddots & & & \\ \vdots & & \frac{1}{6} & \frac{2}{3} & \frac{1}{6} & & \\ \vdots & \cdots & & \ddots & \ddots & \ddots & \\ & \cdots & & & \frac{1}{6} & \frac{2}{3} & \frac{1}{6} \\ 0 & & & & & & 1 \end{pmatrix}_{n \times n} \begin{bmatrix} K_1 \\ \vdots \\ K_n \end{bmatrix} \quad (18)$$

with n>4. The number of control points and knot points are equal for the inverse transform and due to the clamp, $K_i = C_i$ and $K_n = C_n$ hold at the boundary.

For example, the following explains the tracking of the strain-based reconstructed shape of the catheter in a 2D image plane Ω in order to compare the 3D strain-based reconstructed shape with an image obtained by an image source like fluoroscopy according to embodiments of the present disclosure. The present disclosure allows to compute a projection matrix that can be used to project the 3D strain-based reconstructed shape obtained according to embodiments of the present disclosure, expressed in the EMT coordinate frame in the 2D image plan Ω of the fluoroscopy addition information image source.

Out of space considerations, it may be assumed that one of the above methods has been applied and that projection matrix is known. The B-spline tube model in the 2D image plane Ω can the be defined by a set of knot points sampling from the estimated shape from the FBG sensors followed by projecting to the 2D image plane Ω. Thereafter, the corresponding control points can be calculated by equation (18) and interpolated via Equation (17) to obtain a B-spline representation of the shape projected in the image plane. Currently, the estimated shape of the catheter, comprising the optical fiber, in the image plane is represented by a B-spline center line model. However, the shape of the catheter captured by the fluoroscopic additional information image source is normally seen as a contour. Hence, a B-spline tube model $c_i(t)$ may be defined from the center line model to track the catheter shape in the 2D image plane Ω as indicated in Equation (19)

$$c_{i \in \{1, \ldots, n\}}(t) = b_i(t) \pm r \begin{bmatrix} 0 & 1 \\ -1 & 0 \end{bmatrix} \hat{T}_1(t) \quad (19)$$

where n is the number of knot points sampled from the estimated shape by the FBG sensors, $$\hat{T}_1 = \frac{T_i}{\|T_i\|} \text{ and } T_i = \frac{\partial b_i}{\partial t}$$

is the tangent vector at the point $b_i(t)$. The radius of the tube is set as radius r. Since the tube has the same geometrical dimensions and the tube is projected into the image plane with a known scale factor (this can be known by registration process of EMT and fluoroscopy). The radius r can be chosen based on the radius of the catheter (or flexible instrument in which the optical fiber is disposed).

Figure 12A:
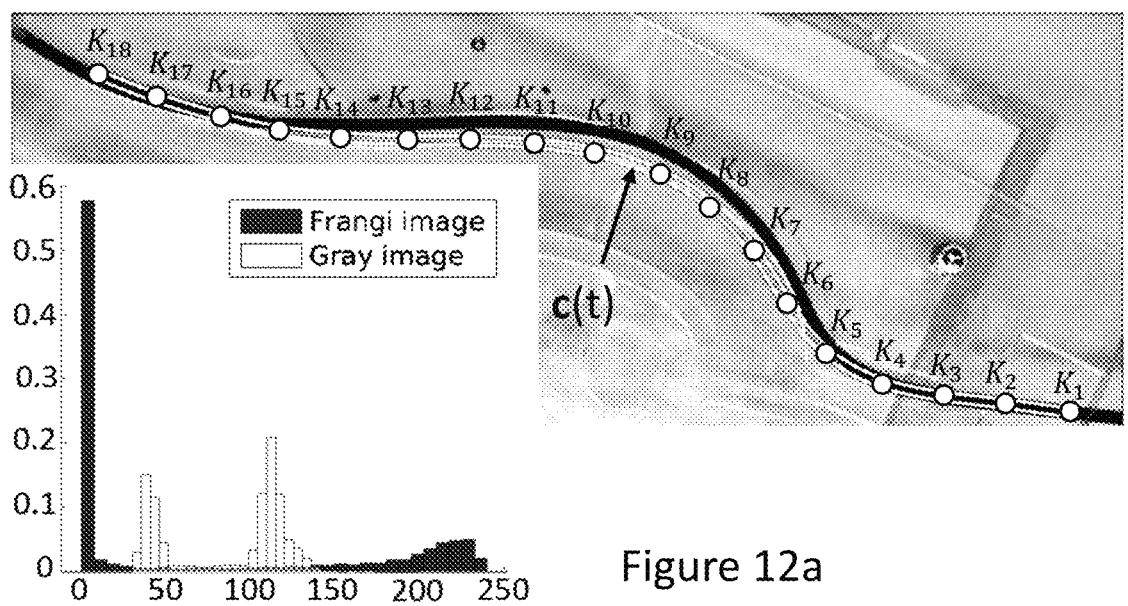
FIG. 12 shows an example of a proposed B-spline tube model as applied in embodiments of the present disclosure.
Figure 12B:
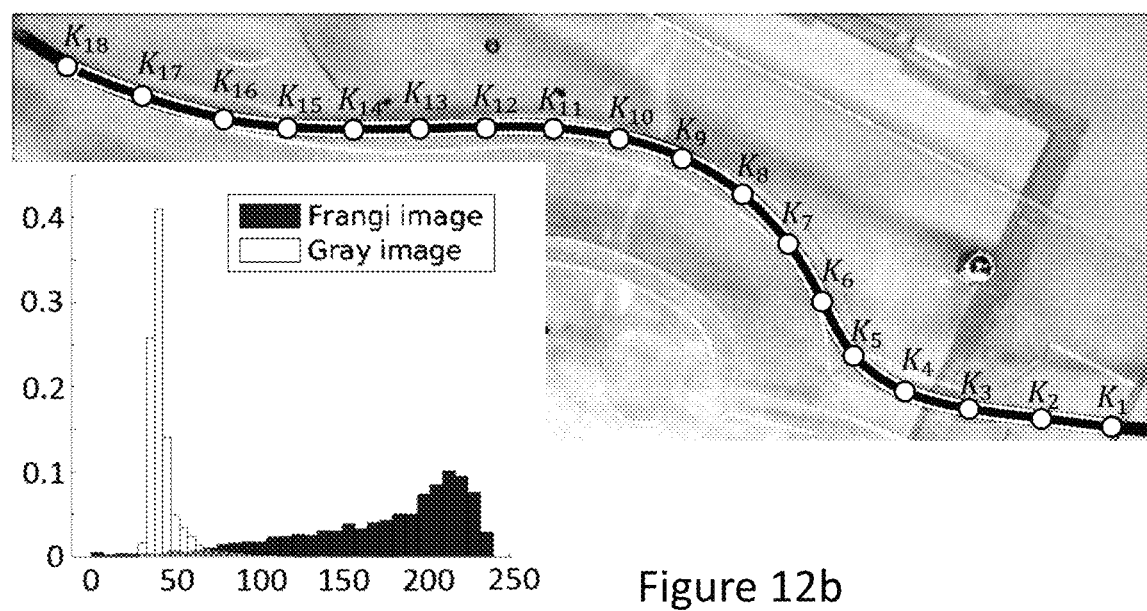
Figure 12C:
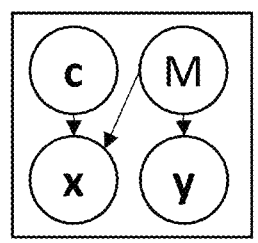

An example of the proposed B-spline tube model in the 2D image plane 106 is shown in FIG. 12a, FIG. 12b and FIG. 12c, wherein FIG. 12a illustrates an initial catheter's contour estimation, FIG. 12b shows an accurate shape of the catheter after maximizing the pixel-wise posterior. The foreground histograms of the catheter shape are shown in the corners of each Figure. FIG. 12c is a graphical model showing the dependency of the tube contour c, foreground and background model M={$M_f$, $M_b$} 60 for pixel location x and measurement y.

The contour c={$c_1, \ldots, c_n$} delimits the foreground $\Omega_f$ and background $\Omega_b$ regions. These two regions are associated to the non-parametric foreground and background appearance models $P(y|M_f)$ and $P(y|M_b)$ respectively with y the pixel value at pixel position x in the image coordinate frame. M={$M_f$, $M_b$} is a model parameter that indicates either foreground or background.

The pixel-wise posteriors $P(c|\Omega)$ is the probability of the catheter or optical fiber comprising flexible device contour c given all pixel data Ω. The joint probability for single pixel given by the jint graphical model shown in FIG. 12c can be found as $$P(x,y,c,M)=P(x|c,M)P(y|M)P(M)P(c) \quad (20)$$

By dividing Equation (20) by $$P(y)=P(y|M_f)P(M_f)+P(y|M_b)P(M_b) \quad (21)$$

which gives $$P(x,y,c,M|y)=P(x|c,M)P(y|M)P(c) \quad (22)$$

where the term P(M|y) is the pixel-wise posterior, of the model M, given a pixel value y by Equation (23)

$$P(M_{j=\{f,b\}}|y) = \frac{P(y|M_j)P(M_j)}{P(y)} \quad (23)$$

Marginalizing Equation (22) over the model M, the pixel-wise posterior probability of contour c given a pixel x with value y is defined as $$P(c|x, y) = \frac{1}{P(x)} \sum_{i=f,b} \{P(x|c, M_i)P(M_i|y)P(c)\} \quad (24)$$

The overall pixel-wise posterior of the catheter contour c given all pixel data Ω is expressed as $$P(c|\Omega)=\Pi_{j=1}^{N}[\Sigma_{i=f,b}\{P(x|c,M_i)P(M_i|y)\}]P(c) \quad (25)$$

This pixel-wise posterior takes into account every single pixel in the foreground and the background. Taking advantage of modeling the likelihood of foreground and background by a non-parametric probability distribution using a histogram, this probabilistic framework can be utilized with several types of prior knowledge. In the proposed approach, the gray scale values and Frangi filtering magnitudes of the image are used as the measurements.

The Frangi filter is a filter which helps to enhance vessels in images by examining the multiscale second order local structure of an image.

The initial estimated tube model in the 2D image plane is defined by the contour c and the probabilistic framework as defined in Equation (25) allows the tracking to be performed by maximizing the posterior of contour c with respect to the knots points $K_i$. The log posterior of Equation (25) is $$\hat{c}=\text{argmax}_c \Sigma_{i=1}^{N} \log\{P(x_i|c,y_i)\}+\log(P(c)) \quad (26)$$

where $P(x_i|c, y_i)$ is defined as $$P(x_i|c, y_i) = \frac{H_\varepsilon(\Phi(x_i))P(y_i|M_f) + (1 - H_\varepsilon(\Phi(x_i)))P(y_i|M_b)}{\Sigma_{i=1}^{N} H_\varepsilon(\Phi(x_i))P(y_i|M_f) + \Sigma_{i=1}^{N}(1 - H_\varepsilon(\Phi(x_i)))P(y_i|M_b)} \quad (27)$$

The function Φ(x) is a signed distance function such that $$\Phi(x) = \begin{cases} 0 & \text{if } x \in c \\ dist & \text{if } x \in \Omega_f \\ -dist & \text{if } x \in \Omega_b \end{cases}$$

where dist is the Euclidean distance between a pixel at location x and the nearest pixel belonging to the contour c. The function $H_\varepsilon$ is a smooth Heaviside function:

$$H_\varepsilon(\Phi(x)) = \begin{cases} \frac{1}{2}\left(1.0 + \frac{\Phi(x)}{\varepsilon} + \frac{1}{\pi}\sin\left(\frac{\Phi(x)\pi}{\varepsilon}\right)\right) & \text{if } -\varepsilon \leq \Phi(x) \leq \varepsilon \\ 0 & \text{if } \Phi(x) < -\varepsilon \\ 1 & \text{if } \Phi(x) > -\varepsilon \end{cases}$$

In order to optimize Equation (26), a Gauss-Newton algorithm may be used. The update $\Delta x$ for each knot point is obtained as in Equation (28)

$$\Delta x = [\Sigma_{m=1}^{|\Omega|} B_m^2 J_m^T J_m] \Sigma_{m=1}^{|\Omega|} J_m^T B_m \quad (28)$$

Where $|\Omega|$ is the number of pixel and the $J_m$ the Jacobian at each pixel being expressed as $$J_m = \frac{\delta H_\varepsilon}{\delta \Phi} \frac{\delta \Phi}{\delta x}\bigg|_{x=x_m} = \delta_\varepsilon(\Phi)\nabla\Phi(x_m) \quad (29)$$

and $$B_m = \frac{P(y_i|M_f) - P(y_i|M_b)}{P(y_i|M_f)H_\varepsilon(x_m) + P(y_i|M_b)(1-H_\varepsilon(x_m))} \quad (30)$$

Utilizing the $\delta_\varepsilon$, function makes only pixels that lie inside a narrow range affect the Jacobian. So, un update for each knot point uses the sum of $\Delta x$ calculated from point x around the point belong to the contour. FIGS. 12a, 12b and 12c show an example of the proposed catheter tracking in the 2D image plane.

The dynamic twist can be estimated by fusing the initial shape reconstructed by the strain sensors, like the FBG sensors in the previous example, and its correct projection in the 2D image plane obtained from the previous step. An optimization problem can be e.g. formulated to adjust the (dynamic) twist induced strain correction term $\varepsilon_{Twist}$ so that the 2D projected shape of the catheter from the knot points matches with the shape that resulted from the catheter tracking in the image plane. The final bend induced strains can then be calculated as $$\varepsilon_{Bend,i\in[1,2,3]} = \varepsilon_i - \varepsilon_0 - \varepsilon_{Twist} \quad (31)$$

The twist induced strain correction term vector $\varepsilon_{Twist}$ can be estimated by minimizing the energy function $$\arg\min D(\varepsilon_{Twist}) + aE_{Localize}(\varepsilon_{Twist}) \quad (32)$$

where the term D is the distance between the catheter shape in the 2D image plane calculated in the catheter tracking in the 2D image step and the projection of the strain-based reconstructed 3D shape from the newly calculates strain distributions from Equation (31). $E_{Localize}$ is the localisation error of the computed catheter shape in the EMT coordinate system. The scaling factor a regulates the relative effect between these terms. Where D could be defined by $$D = \frac{1}{n}\sum_{i=1}^{n} M^2(proj(s_i^e)) \quad (33)$$

Where n is the total number of points used to represent the catheter center line model in the EMT coordinate system. The term $proj(s_i^e)$ are the projections of the catheter shape in the 2D image plane. M is the function that expresses the distance between $proj(s_i^e)$ and its closest point in the 2D image of the catheter tube model found from the fluoroscopy-based catheter tracking. This distance is calculated by the Euclidean distance. The term $E_{Localize}$ could be calculated as a sum of squares of residual errors:

$$E_{Localize} = \frac{1}{4}\sum_{i=1}^{4} \|N_i^e - {}_f^e T N_i^f\|^2 \quad (34)$$

Using this approach, the twist induced strain correction term $\varepsilon_{Twist}$ can be estimated such that it maximizes the correspondence between the reconstructed shape $S^e$ with the catheter shape in the 2D image plane and the poses of EMT sensors in the EMT coordinate frame. The newly estimated $\varepsilon_{Twist}$ can be used throughout in the upcoming time steps until the next fluoroscopic image is available. Experiments have shown that incorporating fluoroscopic image and EMT pose (position and/or orientation) measurements effectively improves the accuracy of the overall shape reconstruction.

Figure 13A:
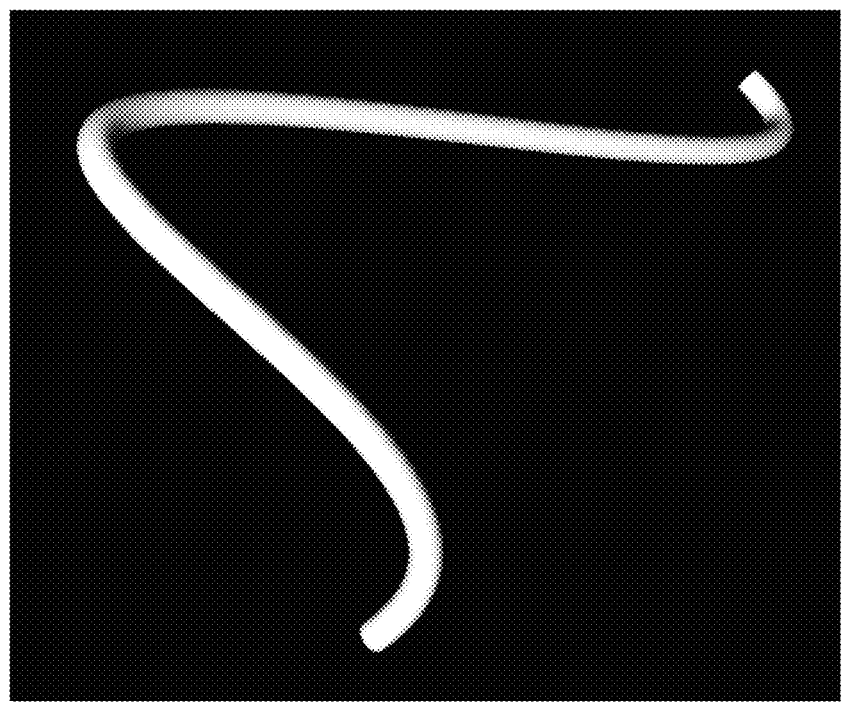
FIG. 13a shows a design of a 3D printed tube that can be used for validating shape sensing performance of a preferred embodiment of the present disclosure.
Figure 13B:
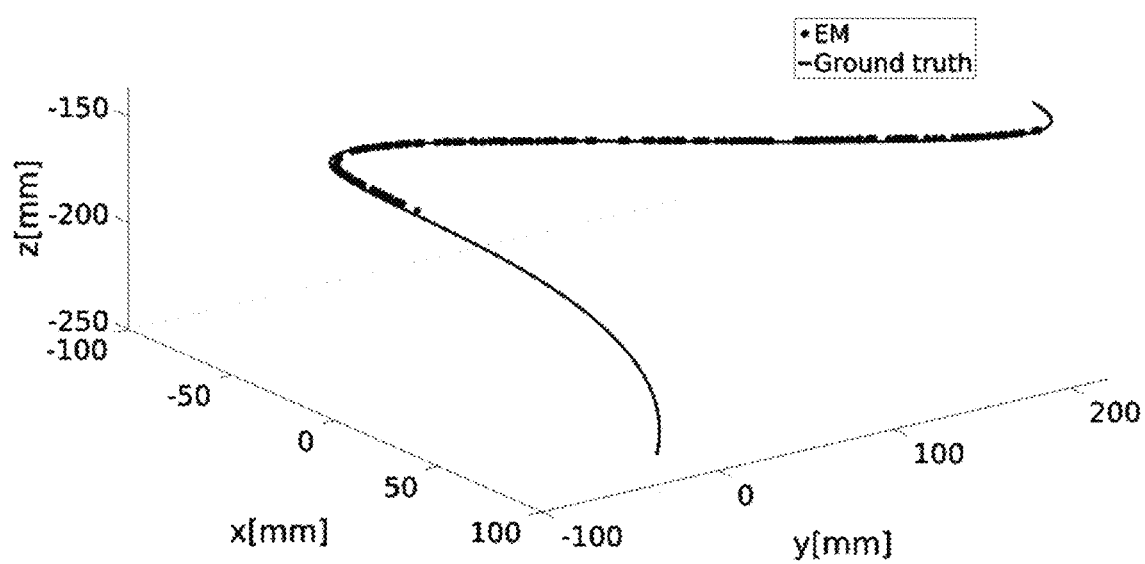
FIG. 13b is an illustration of the 3D printed tube as depicted in FIG. 13a and registered in the EMT coordinate system by sliding an EMT sensor along the tube.

To evaluate the aforementioned approach, two experiments were carried out in a lab setup. The first experiments are designed to verify the efficiency of the method in an in-plane bending case. In these experiments is the catheter placed on top of the table-top NDI Aurora EMT field generator. Furthermore, a monocular camera is positioned above facing downward to mimic the fluoroscopy. The camera image plane is parallel to the plane of the field generator and the used catheter is the one detailed above. During the experiments, the catheter is bent in two directors in a plane that is parallel to the camera's image plane. This allows to maximize the area captured by the camera. Therefore, the image is ensured to incorporate as much spatial information as possible. The camera images are recorded at thirty (30) frames per second (fps) while the catheter is bending. The second experiment is carried out to evaluate the effect of the algorithm during a catheter retraction process. In this experiment, a tube with predefined shape, given as a mathematical function was 3D printed. The design of the 3D printed tube is shown in FIG. 13a. The inner diameter of the tube is 4.2 millimeters (mm) which closely fitted the outer diameter of the catheter sheath and the arc lengths of the tube was 500 millimeters (mm) long. The catheter was inserted and progressed in that 3D printed tube during the experiment, the wavelengths of the fiber and the pose measurements from the EMT sensors are recorded to reconstruct the shape of the catheter. FIG. 13b is an illustration of the 3D printed tube as depicted in FIG. 13a and registered in the EMT coordinate system by sliding an EMT sensor along the tube. The points on this figure are EMT positions gathered during this action.

Figure 14A:
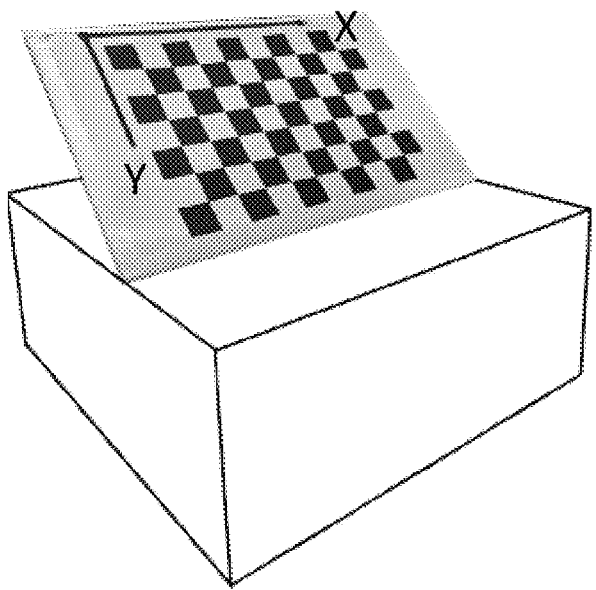
FIG. 14a and FIG. 14b show a known size chessboard pattern used to demonstrate the working principle of embodiments of the present disclosure to register the Electromagnetic tracking (EMT) coordinate and the image frame.
Figure 14B:
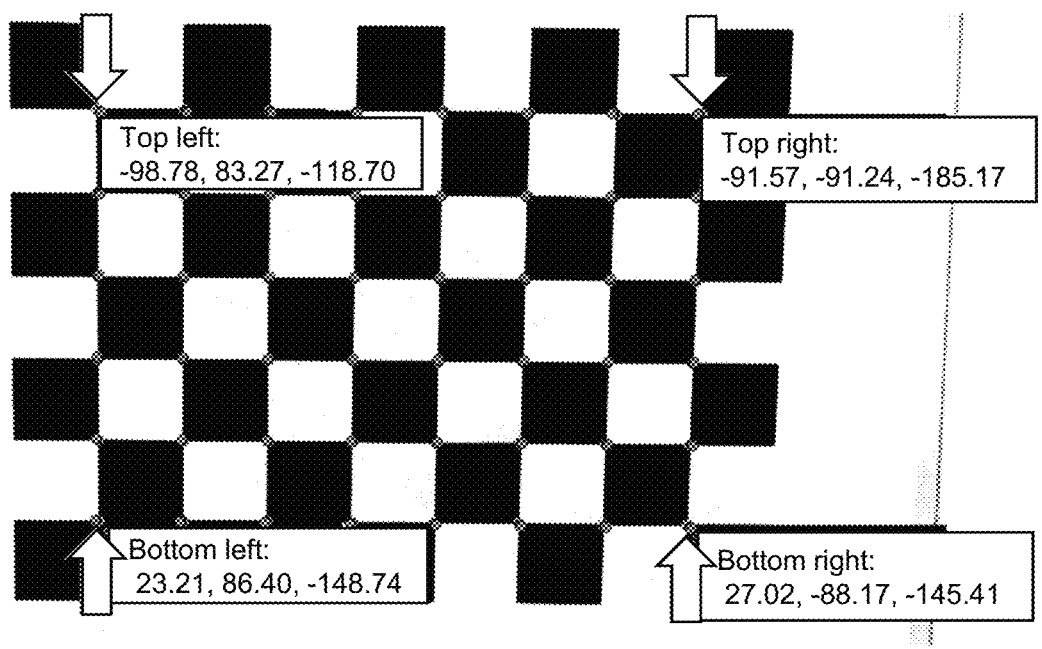

A known size chessboard pattern has been used to register the EMT coordinate and the image frame as shown in FIG. 14a and FIG. 14b. FIG. 14a is a picture of an experimental setup for EMT—image plane registration, whereas FIG. 14b is a picture having dots or projected points in the image frame and wherein the arrows show the measurement point of the EMT sensors.

Referring to FIG. 14a and FIG. 14b and the known size chessboard pattern used to register the EMT coordinate and the image frame, first the positions of four outer corners of the planer pattern are recorded in the EMT coordinate frame. The 3D coordinates of the inner corners of the pattern are calculated based on the real geometry of the pattern. This 3D set of coordinates is denoted as $O_{3\times n}^e = [m_1 \ldots m_n]$.

An image is obtained by the camera and undistorted by the camera distortion parameters. A chessboard pattern detection algorithm is performed to find coordinates of corner points in the undistorted image. The set of 2D corner coordinates in an image plane {im} is denoted as $Q_{2\times n}^{im} = [q_1 \ldots q_n]$. The matrix $Q^{im}$ is re-arranged to make each column $i^{th}$ in $Q^{im}$ is a 2D projection of point $i^{th}$ in $O^e$. The 2×4 projection matrix P to project the 3D coordinate from EMT to 2D image plane is obtained by solving the following optimization problem $$\min_{P}\left\|P\begin{bmatrix}O^g_{3\times n}\\1_{1\times n}\end{bmatrix}-Q^{im}_{2\times n}\right\| \quad (35)$$

A unique optimal solution can then be calculated with an appropriate number of points. At least four points should be used. In our experiments related to the present disclosure, forty-five points were used to register between the EMT coordinate frame and the image plane shown in FIG. 14*a* and FIG. 14*b*. The mean residual error was 0.5858±0.0485 mm and the maximum residual error was 1.5637 mm.

Figure 15A:
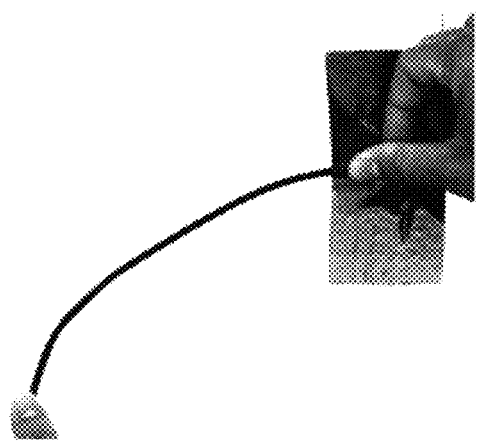
FIG. 15a is an image of a catheter captured by a camera, wherein at least a portion of the catheter comprises an optical fiber that is adapted to perform a method according to embodiments of the present disclosure to generate ground truth shape.
Figure 15B:
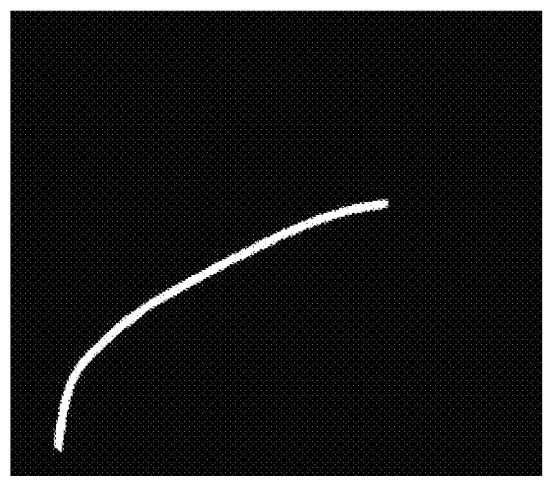
FIG. 15b is the result of color segmentation and skeletonization process according to embodiments of the present disclosure.
Figure 15C:
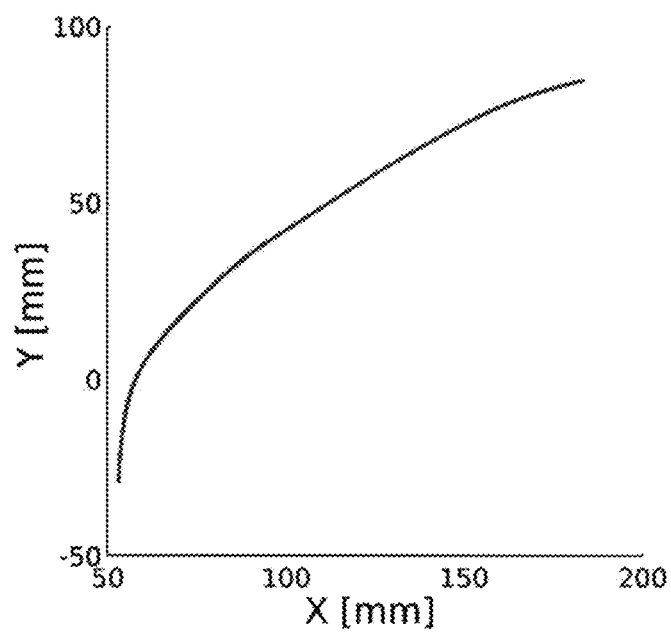
FIG. 15c is a projection in the x-y plane of a 3D ground truth shape in an EMT coordinate system according to embodiments of the present disclosure.

A ground truth generation process for evaluating the accuracy of a method for shape sensing an optical fiber according to embodiments of the present disclosure, is explained below and illustrated in FIG. 15*a*, FIG. 15*b* and FIG. 15*c*. FIG. 15*a* is an image captured by a camera. FIG. 15*b* is the result of color segmentation and skeletonization process, and FIG. 15*c* is a 3D ground truth shape in an EMT coordinate system.

The ground truth data for evaluating the accuracy of our method in the first experiment is generated from the images acquired with the camera. The image is first processed to extract the catheter shape in 2D by color segmentation. Each contour in the image can be evaluated to find the contour that encloses the largest area. This contour can then be considered as the catheter's contour. Thereafter, the contour can be skeletonized. The set of points that belongs to the skeleton are the 2D projected shape of the catheter in the image plane. An affine transformation can then be performed to map this set of points to the EMT coordinate frame. Since the catheter is bent in the x-y plane, the z value can be seen as constant and can be determined from averaging the z value from the two attached EMT sensors. The 3D set of skeleton points can then be approximated with the B-spline curve presented above. This spline is treated as the ground truth.

In the second experiment, the 3D printed tube was fixed on top of the field generator. Since the 3D printed tube is made with a predefined mathematical function $x=49.525(2\cos(t)-\cos(2t))\sin(2t)$ $y=53.025(2\sin(t)-\sin(2t))sc\ COS(2t)$ $z=100t \quad (36)$ where t=[0.775π, 1.505π] the expected ground truth shapes of the catheter during the insertion process are known. The position of the 3D tube in the EMT coordinate frame can then be determined by sliding an EMT sensor along the 3D tube to gather positional data as shown in FIG. 13*b*. This set of data allows then to determine the tube position in the EMT coordinate by using the above point-based registration method. The ground truth shapes provided by the mathematical function were also used to generate an ideal fluoroscopic views of the scene, as the 3D printed tube was not transparent which means that the catheter shapes during the retraction process could not be captured by the camera. The use of a virtual camera to simulate the fluoroscopic system also helps exclude errors caused by the registration process between the two coordinate frames. The virtual camera was placed at 200 mm from the 3D printed tube and the generated image size was set to 512×512 px.

The strain-based reconstructed shape of an optical fiber, or of a catheter comprising an optical fiber as demonstrated in the previous examples, according to embodiments of the present disclosure, is compared to the ground truth shape via the following metrics:

The maximum distance error between the reconstructed shape and the ground truth shape The rms error and The rms error along the respective x, y and z axes of the EMT coordinate system.

The distance error $d_{min}(S_{gt}^e, S_{est}^e(i))$ is the distance between the $i^{th}$ point of the estimated shape $S_{est}^e$ to the closest point on the ground truth shape $S_{gt}^e$. In our error evaluation, the error form both the shape estimated by EMT and FBG sensors (without twist compensation) and the shape reconstructed using the method according to embodiments of the present disclosure, i.e. a reconstructed shape using a correction strain distribution, are compared.

Figure 16:
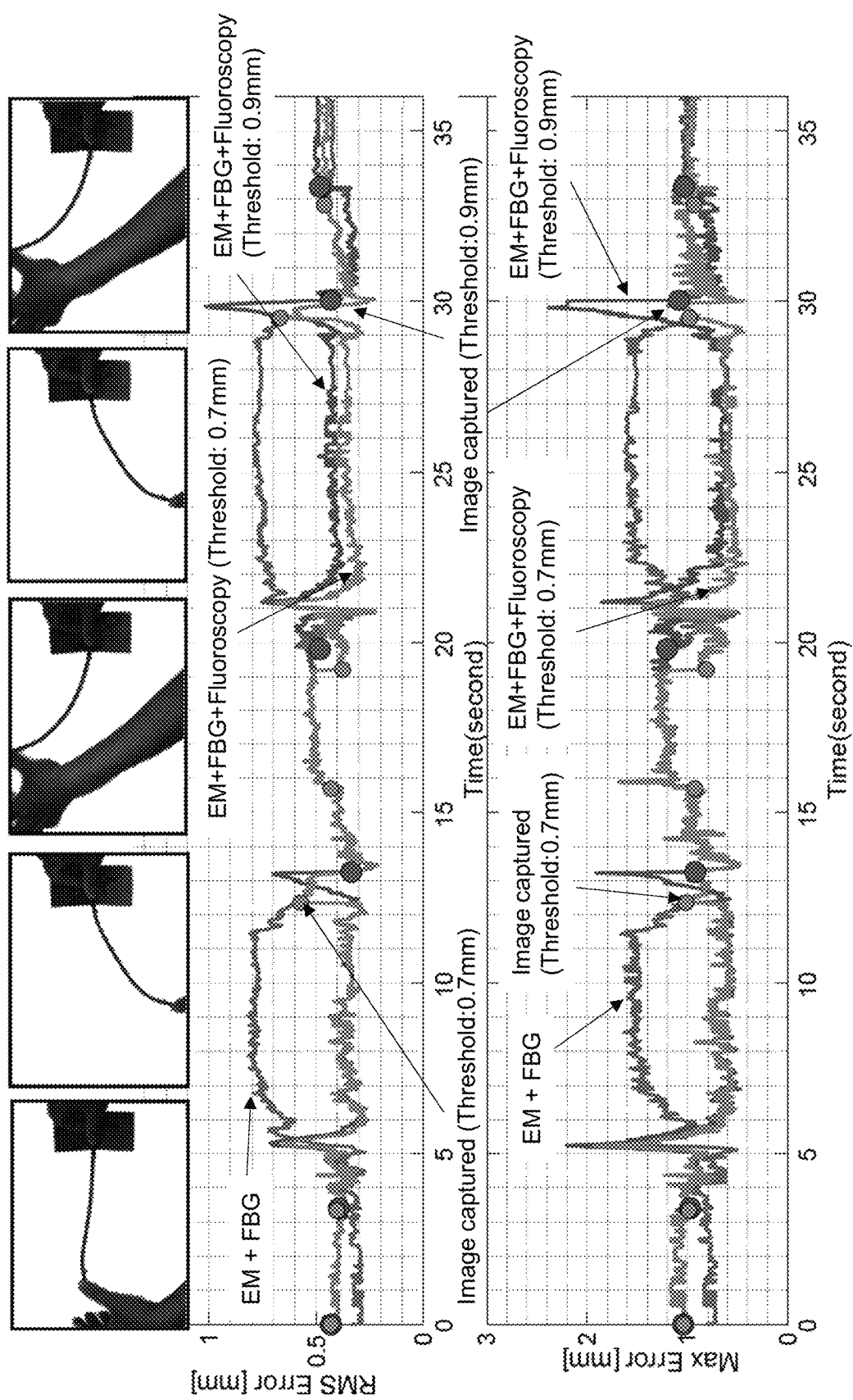
FIG. 16 depicts the results of the shape reconstruction according to embodiments of the present disclosure during an in-plane bending experiment.

Referring to FIG. 16, FIG. 16 depicts the results of the shape reconstruction in the in-plane bending experiment. The top figure ('a)') in FIG. 16 shows a series of images captured by a camera. The middle figure ('b)') in FIG. 16 illustrates the RMS error of different configurations of the optical fiber as explained below, and the bottom figure ('c)') figure in FIG. 16 shows the maximum distance error.

In one embodiment, the spatial calibration step was first carried out to find the corresponding shape points $1_{Base}$ and $1_{Tip}$ of the two EMT sensors. The calibration transformation matrices $1_{Calib}$ were determined for each EMT sensor to shift the EMT measurements to the corresponding points on the center line of the catheter. One can envision at least two approaches to decide when a fluoroscopic image should be taken. A first approach could compare the error in the registration between the EMT and the shape reconstruction frame in the process of localization the reconstructed shape in the EMT frame ($E_{Localize}$) with a predefined threshold value. If the registration error would exceed the threshold value, a fluoroscopic image could be commanded to re-estimate the twist induced strain. In the in-plane bending experiment, two values were used as threshold. Experiments were done with two values: 0.7 mm and 0.9 mm. The lower the threshold value is, the higher the number of fluoroscopic image would need to be taken which leads to higher accuracy. The second approach could take fluoroscopic images at a fixed rate. In the 3D verification experiment, the simulated image were used at 0.6 Hz and 0.3 Hz. The time steps when fluoroscopic images were taken have been marked with black and grey filled circles in FIG. 16. The proposed catheter shape reconstruction method was conducted on a 1.9 GHz Intel Core 17 processor (8 CPUs) machine with 32 GB of RAM and was able to run at 30 Hz. By incorporating fluoroscopic measurements, the reconstructed shape is improved. The catheter was first put in a straight configuration following by bending left and right on the plane that is parallel to the field generator. The dashed black line shows the error obtained with improved FBG-based shape reconstruction method, while the black line and the grey line shows the error obtained by the proposed framework with threshold values of 0.7 mm and 0.9 mm, respectively.

Figure 17:
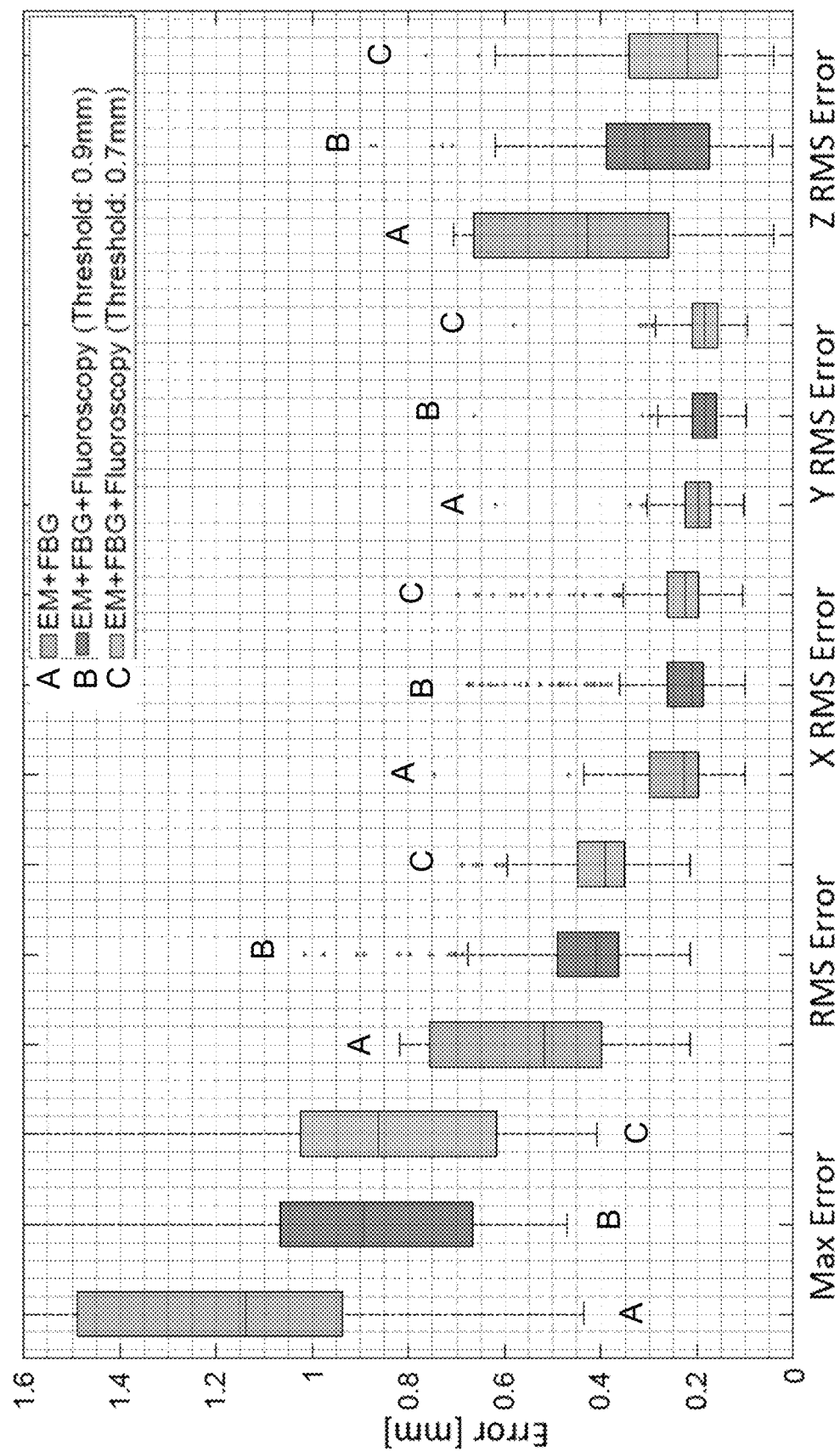
FIG. 17 shows the results of the analysis of each evaluation metric comparing the reconstruction errors as a result of embodiments of the present disclosure when using EMT and FBG data and the proposed framework (i.e. EMT, FBG and fluoroscopy) of shape reconstruction for the in-plane experiment.

FIG. 17 provides the results of the analysis of each evaluation metric comparing the reconstruction errors when using only EMT and FBG data and the here proposed framework (i.e. EMT, FBG and fluoroscopy) of shape reconstruction for the in-plane experiment.

By applying the proposed framework to estimate the twist induced strain with the predefined threshold values of 0.7 mm, both the median of max distance error and the rms error decreased from 1.14 mm to 0.86 mm and from 0.52 mm to 0.39 mm, respectively. Moreover, the errors were more consistent. The interquartile of the max distance error and the rms error of the proposed framework were 0.408 mm and 0.098 mm. The overall error in shape reconstruction was also decreased in the case that the threshold value was set to 0.9 mm. However, higher accuracy was achieved with the threshold value of 0.7 mm since higher number of fluoroscopic images was taken. There were seven images and six images that were captured when the threshold was set to 0.7 mm and 0.9 mm during 36 seconds bending in-plane experiment, respectively.

Figure 18A:
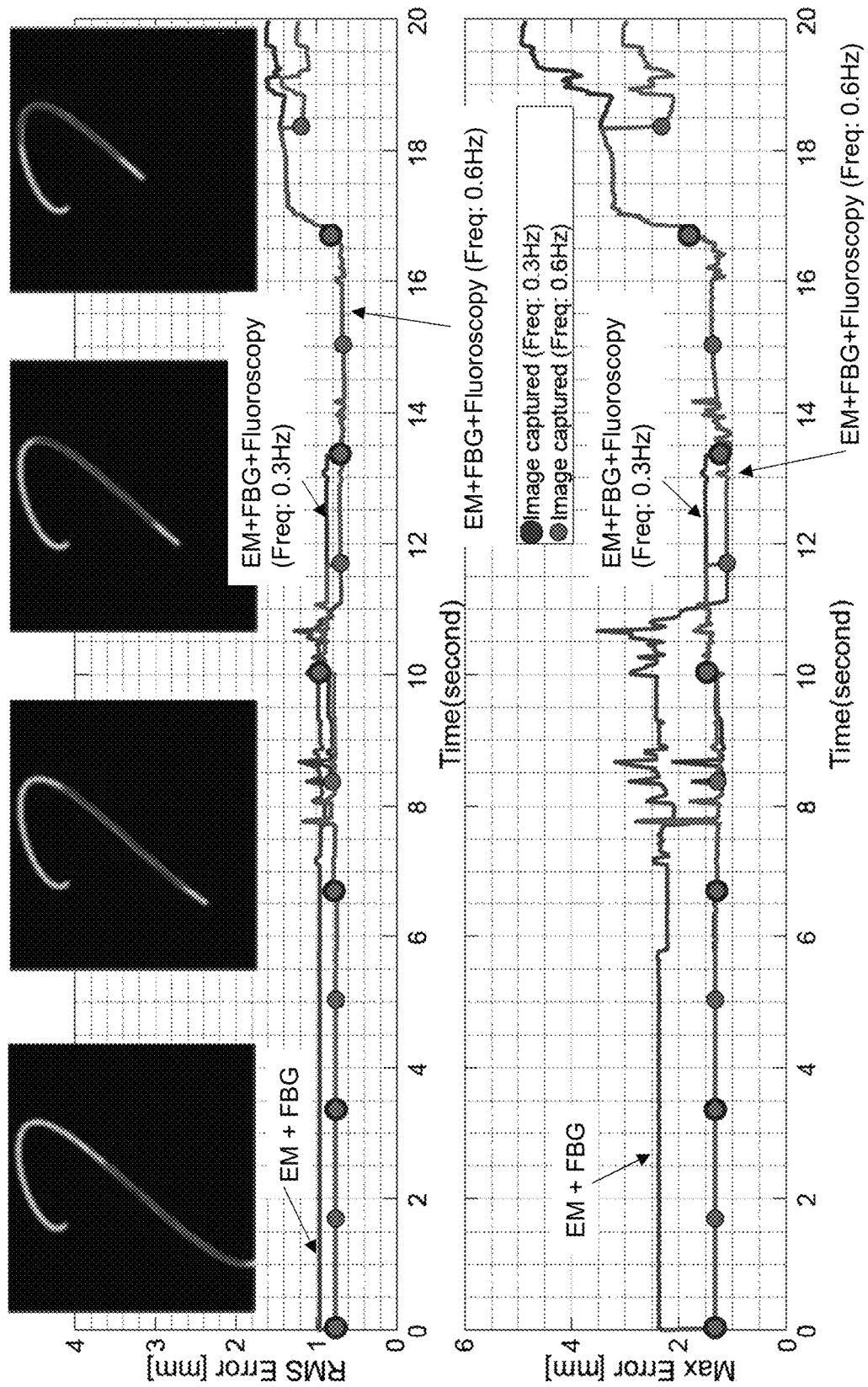
FIG. 18a shows the results of the 3D bending experiment according to embodiments of the present disclosure.
Figure 18B:
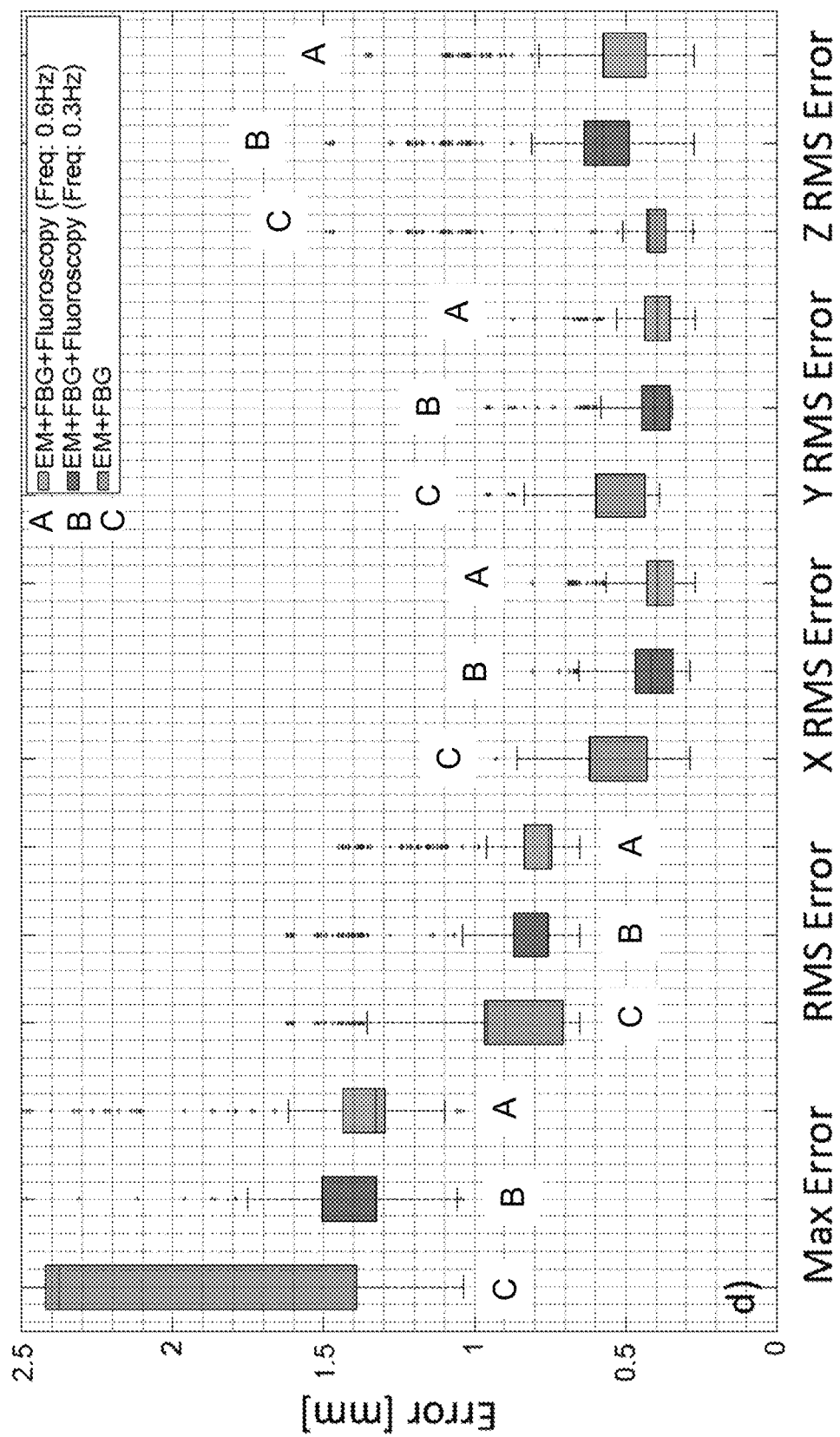

FIGS. 18a-18b show results of the 3D bending experiment. The catheter was first inserted into the 3D printed tube. The data was recorded during retraction. By incorporating the 2D image in the shape reconstruction, both the median of the max distance error and the median of the RMS error decreased from 2.38 mm to 1.32 mm and 0.96 mm to 0.76 mm, respectively. There was a slight increase in RMS error along the z axis of from 0.42 mm to 0.55 mm. This is caused by the fact that the simulated camera was placed parallel to the natural plane of the 3D printed tube and the 2D image cannot capture much information of the catheter in the z direction. In practice, this problem can be solved by choosing the orientation of the fluoroscope so that it maximizes the spatial information that is captured. The optimal orientation of the fluoroscope can be determined based on pre-operative models of the patient's anatomy. Moreover, biplane fluoroscopy could be used to capture images from different angles which in theory would improve the performance of the fusion framework.

Embodiments of the present disclosure can be applied to different shape sensing methods based on distributed strain sensing along a flexible (interventional) instrument. The compensation method is not limited to compensate the twist induced strain measured by surrounding (non-central) fiber cores, but also can be used to estimate and compensate for any other common strain value that is added to the bend induced strain distribution $\varepsilon_{Bend}$ For example, in case there is no central core in the MCF (multicore) fibers, the present disclosure can be used to compensate for the temperature variation induced strain since the temperature variation induced strain can be assumed equal for all the neighboring cores.

The detailed presented embodiment in the previous section can be implemented in such a manner for example, but other implementations can be derived following similar lines. According to one preferred embodiment, the EMT sensor can be eliminated. The 3D reconstructed shape the flexible instrument can be then mapped directly to the 2D image plane of the fluoroscopic image system by 3D-2D registration methods. Other additional information such as e.g. a pre-operative model of the anatomy could be used and 3D-3D registration methods can be applied to exclude the use of EMT system. For example, a method to automatically register a pre-operative model to the intra-operative scene by incorporating the knowledge that under normal condition the catheter will be restrained to stay inside the vessel. A similar measuring could be adopted to correct for twist parameters such that the estimated shape remains inside the vessel.

Where a number of sensors and models have been described it is clear that any type of additional information can be considered to improve twist and shape reconstructed estimates. For example, information from optical coherence tomography (OCT), intravascular ultrasound (IVUS), confocal microscopy, external ultrasound accelerometers, optical or (electro) magnetic trackers, imaging or any type of sensor that can capture part of the catheter's state may be used advantageously.

In one particular interesting embodiment according to the present disclosure, impedance-based localization method can be used as an alternative/replacement to the EMT system. The use of impedance-based tracking system provides absolute distributed position sensing along the instrument's length. This absolute distributed position information along the instrument's length could be used advantageously to estimate the twist induced strain and reconstructed the shape of the optical fiber. This additional information could potentially also replace the information from the fluoroscopic system. Such approach could eliminate even further the problem of X-ray radiation completely during the procedure.

In another particular interesting embodiment, the present disclosure could be used as a method to carried out in the calibration process where the instrument is configured in different known shapes. The present disclosure could then be used to estimate the common strain that effects all the surrounding cores to compensate so that the reconstructed shapes maximally correspond to the known shapes. The set of raw measured strains from the strain sensor and the compensated core could then be used to build a look up table or to train a machine learning model that can be used during the procedure without the need of an additional sensor.

Figure 19:
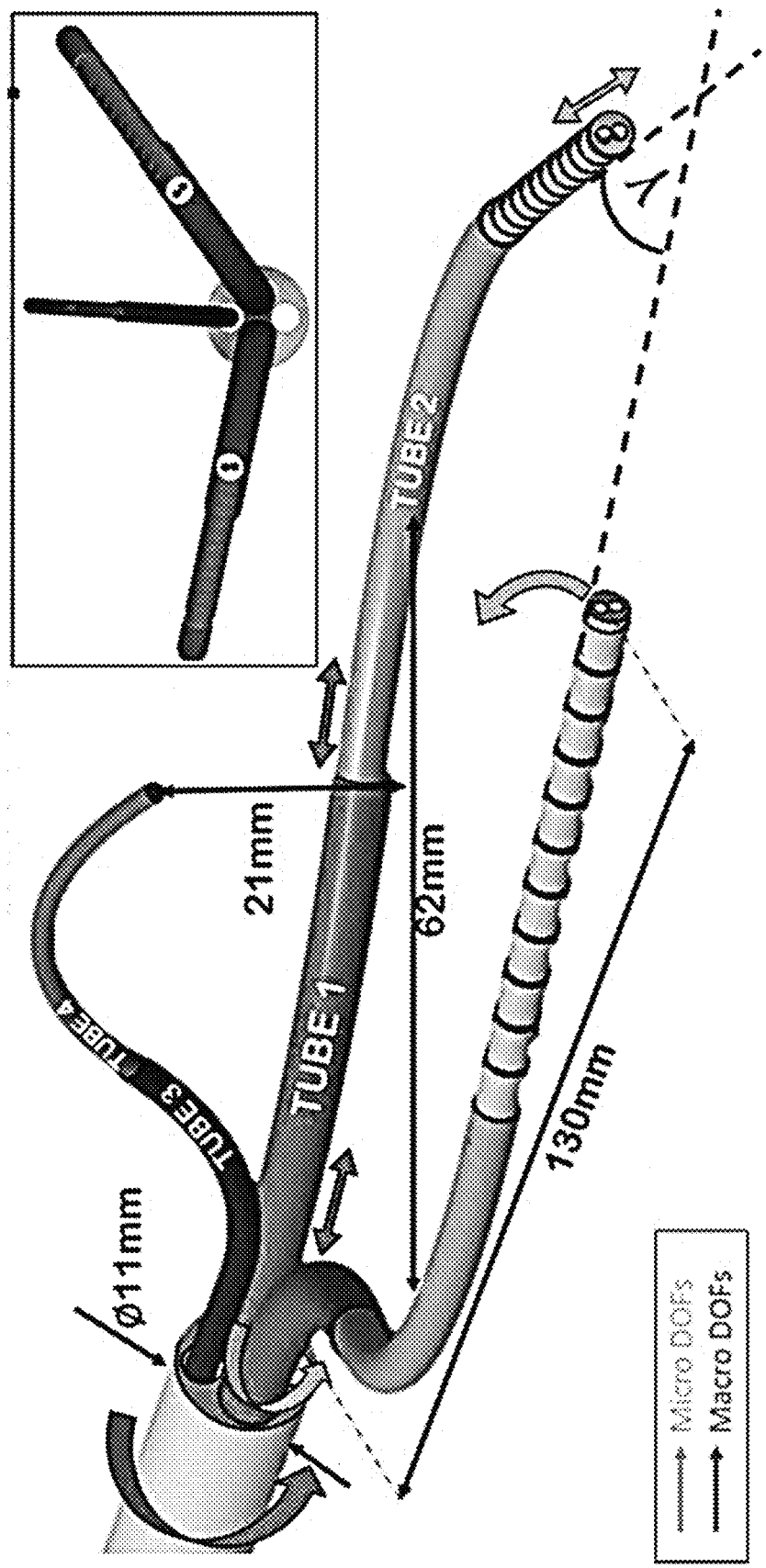
FIG. 19 shows an isometric figure upon a single-port access surgery instrument featuring a plurality of arms that may vary shape upon actuation and of which knowledge of the shape—following an embodiment included in the present disclosure—may help precise modelling and/or control of the said plurality of arms.

In one particular interesting embodiment, the present disclosure could be applied to single port access (SPA) robotic system to help improving the shape tracking accuracy. SPA robotic systems normally contain several instrument arms together with a camera that hovers above the instruments. An example of such a multi-arm robotic system that is used for single port access surgery is shown in FIG. 19. Thanks to the small size and flexible nature of the optical based shape sensing techniques, these sensors can be easily integrated into these instrument arms with minimal effect on the mechanical behavior of the system. In this case, twist compensation could also be used to improve the estimated shape. A very similar approach with the detailed presented embodiment could be used whereby in this case the fluoroscopy is replaced by e.g. the camera-view. The shape reconstructed from optical based shape sensing method can be mapped to the image plane by auto registration method or by embedding additional tracking sensor on the robotic arm and camera. Since the camera-view is now used as the additional information source and the normal camera is not harmful to patient as the fluoroscopy, this allows continuously estimate and compensate for the dynamic twist during the procedure which leads to better shape sensing accuracy.

Figure 20:
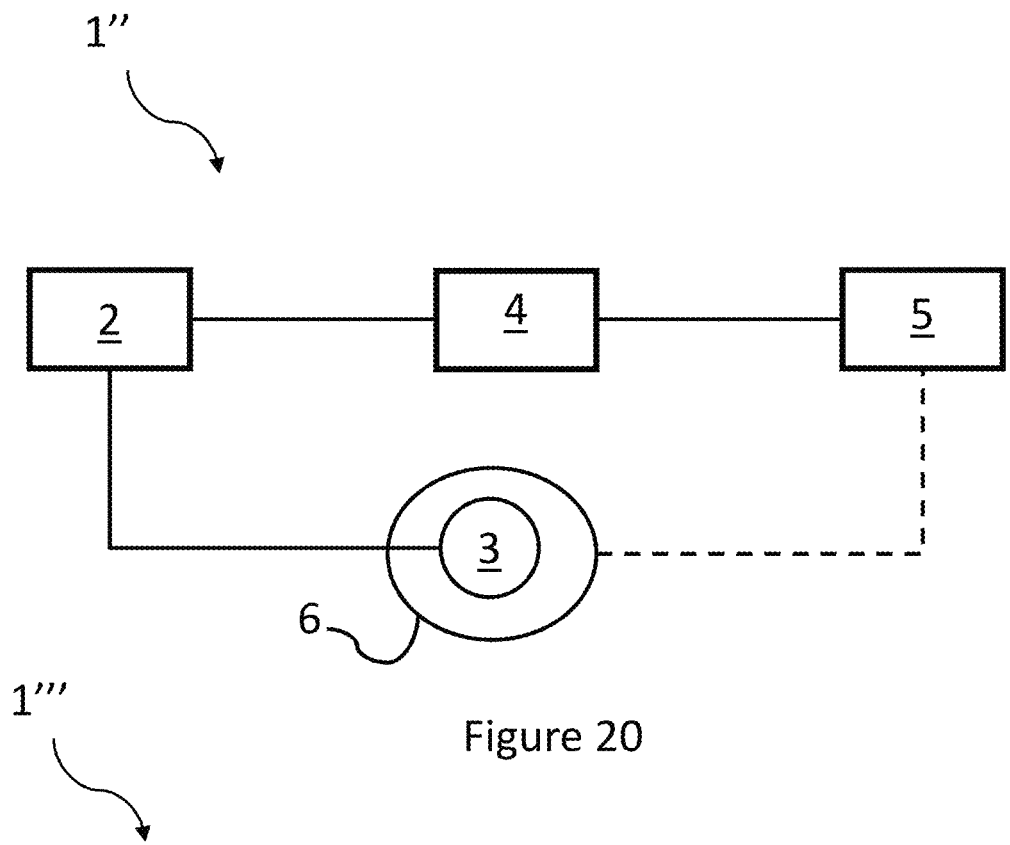
FIG. 20 shows a schematic block diagram of a shape sensing system for shape sensing an optical fiber embedded at an offset of the center within at least a portion of an interventional device according to embodiments of the present disclosure.

Referring to FIG. 20 there is illustrated a schematic block diagram of a shape sensing system 1" for shape sensing an optical fiber 3 embedded within at least a portion of an interventional device 6 according to embodiments of the present disclosure. In contrast to FIG. 1, FIG. 20 shows an embodiment of the present disclosure whereby the optical fiber is located at a radial offset or radial distance from the center of the interventional device 6.

When reference is made to "center of the interventional device", reference may be made to "along the longitudinal center axis of the interventional device". A similar reasoning may be made to "center of the optical fiber", i.e. when reference is made to "center of the optical fiber", reference may be made to "along the longitudinal center axis of the optical fiber".

Figure 21:
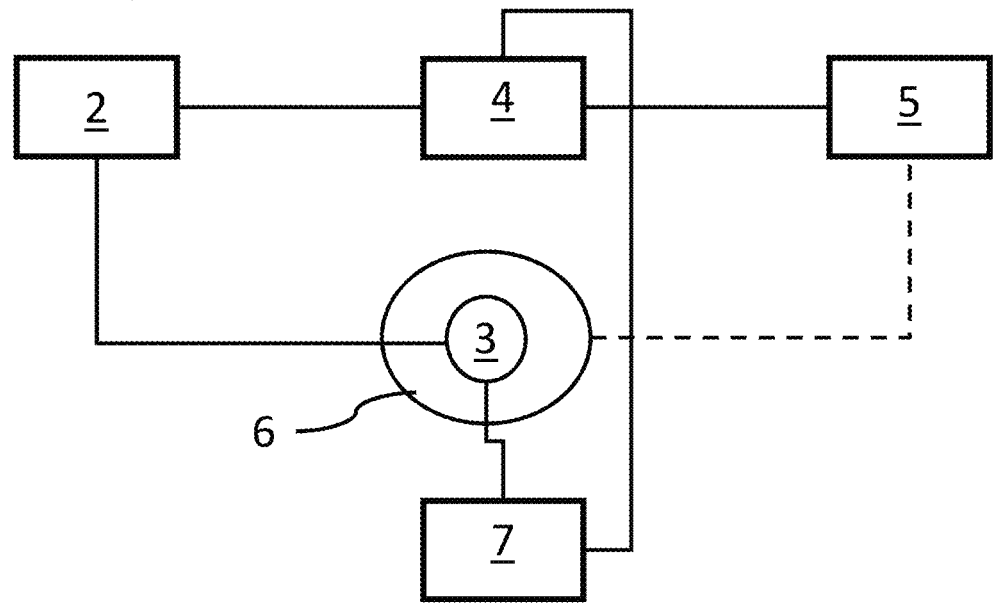
FIG. 21 shows a schematic block diagram of a shape sensing system for shape sensing an optical fiber embedded at an offset of the center within at least a portion of an interventional device according to embodiments of the present disclosure.

Referring to FIG. 21 there is illustrated a schematic block diagram of a shape sensing system 1" whereby the optical fiber 3 is located at a radial offset from the center of the interventional device 6 and that further comprises a position tracking unit 7 connected to at least one tracking sensor disposed in the optical fiber 3. According to preferred embodiments of the present disclosure, this tracking sensor may be an Electromagnetic Tracking (EMT) sensor. The position tracking unit 7 may be connected to the data processing and memory unit 4 to send and receive data, signals and instructions.

Aspects of the present disclosure are defined in the following alphanumerically ordered clauses.

A1 A method for shape sensing an optical fiber embedded within at least a portion of an interventional device, the optical fiber comprises at least one outer fiber core disposed at a non-zero radial distance from a longitudinal center axis of the optical fiber and/or at a non-zero radial distance from a longitudinal center axis of the interventional device, wherein the at least one outer fiber core is extending along the longitudinal center axis of the optical fiber and having at least one strain sensor adapted to generate strain-based shape sensing data of the optical fiber, the method comprising the steps:
  i. obtaining, from the at least one strain sensor, strain-based shape sensing data of the optical fiber;
  ii. correcting, by a shape sensing system, the strain-based shape sensing data with a strain correction term;
  iii. calculating, by the shape sensing system, a strain-based reconstructed shape of the optical fiber based on the corrected strain-based shape sensing data; and
  iv. mapping the strain-based reconstructed shape of the optical fiber in a coordinate system;
  wherein the strain correction term is a predetermined strain correction term derived from a step of comparing a previous strain-based reconstructed shape of the optical fiber with additional information related to the shape of the optical fiber obtained from an additional information source other than the at least one strain sensor.

A2 The method for shape sensing an optical fiber according to clause A1, further comprising a step of updating the predetermined strain correction term based on a comparison between the mapped strain-based reconstructed shape of the optical fiber with a reconstructed shape of the optical fiber based on the additional shape information in the coordinate system.

A3 The method for shape sensing an optical fiber according to clause A2, wherein the comparison is based on varying the predetermined strain correction term in order to minimize the shape difference between the strain-based reconstructed shape of the optical fiber and the reconstructed shape of the optical fiber based on the additional shape information in the coordinate system.

A4 The method for shape sensing an optical fiber according to clause A2 or A3, wherein the step of updating the predetermined strain correction term is performed at a predetermined time interval.

A5 The method for shape sensing an optical fiber according to clause A1, further comprising the step of
  selecting the most recent additional information generated by the additional information source;
  comparing the mapped strain-based reconstructed shape of the optical fiber with a reconstructed shape of the optical fiber based on the additional shape information in the coordinate system; and
  updating the predetermined strain correction term based on the comparison.

A6 The method for shape sensing an optical fiber according to clause A5, wherein the comparison between the mapped strain-based reconstructed shape of the optical fiber with a reconstructed shape of the optical fiber based on the additional shape information in the coordinate system, is based on varying the predetermined strain correction term in order to minimize the shape difference between the strain-based reconstructed shape of the optical fiber and the reconstructed shape of the optical fiber based on the additional shape information in the coordinate system.

A7 The method for shape sensing an optical fiber according to any of the previous clauses, wherein the strain correction term comprises a twist induced strain correction term representing a dynamically variable twist applied on the optical fiber.

A8 The method for shape sensing an optical fiber according to any of the previous clauses, wherein the optical fiber further comprises a central fiber core disposed along the longitudinal center axis of the optical fiber and having at least one strain sensor adapted to provide strain-based shape sensing data of the optical fiber.

A9 The method for shape sensing an optical fiber according to any of the previous clauses, wherein the optical fiber further comprises at least one tracking sensor, in particular an electromagnetic tracking (EMT) sensor, adapted to provide additional information, in particular tracking data, about the position of the optical fiber information in the coordinate system.

A10 The method for shape sensing an optical fiber according to any of the previous clauses, wherein the strain-based reconstructed shape of the optical fiber is based on bend induced strain data from which a curvature and a bending angle of at least a portion of the optical fiber is derived, wherein the bend induced strain data is corrected by a twist induced strain correction term.

A11 The method for shape sensing an optical fiber according to any of the previous clauses, wherein the additional information source is a fluoroscopic image source, a preoperative model computed tomography scan source, a magnetic resonance image source, a kinematic model source, a dynamic model source, an electromagnetic tracking system source, or other image derivable shape/pose data source.

A12 The method for shape sensing an optical fiber according to any of the previous clauses, wherein the at least one strain sensor is selected from the group consisting of an FBG sensor or an impedance strain sensor.

A13 The method for shape sensing an optical fiber according to any of the previous clauses, further comprising the steps of:
  determining a calibration relationship between the coordinate system in which the strain-based reconstructed shape of the optical fiber is mapped and a coordinate system from the additional data source; and
  mapping the additional information from the additional data source in the coordinate system using the calibration relationship.

A14 A shape sensing system configured to perform a method for shape sensing an optical fiber embedded within at least a portion of an interventional device according to any of the previous clauses, wherein the optical fiber comprises at least one outer fiber core disposed at a non-zero radial distance from a longitudinal center axis of the optical fiber and/or at a non-zero radial distance from a longitudinal center axis of the interventional device, wherein the at least one outer fiber core is extending along the longitudinal center axis of the optical fiber, and wherein the at least one outer fiber core has at least one strain sensor adapted to generate strain-based shape sensing data of the optical fiber, the shape sensing system comprising:
- a strain measuring unit in communication with the optical fiber and configured to obtain, from the at least one strain sensor, strain-based shape sensing data of the optical fiber;
- a data processing and memory unit in communication with the strain measuring unit and configured to at least correct the strain-based shape sensing data with a strain correction term, calculate a strain-based reconstructed shape of the optical fiber based on the corrected strain-based shape sensing data; and map the strain-based reconstructed shape of the optical fiber in a coordinate system; and
- an additional information source in communication with the data processing and memory unit;
- wherein the strain correction term is a predetermined strain correction term derived from a step of comparing a previous strain-based reconstructed shape of the optical fiber with additional information related to the shape of the optical fiber obtained from the additional information source other than the at least one strain sensor.

A15 Use of a shape sensing system according to clause A14 for shape sensing an optical fiber embedded within at least a portion of an interventional device.

The invention claimed is:

1. A method for shape sensing an optical fiber embedded within at least a portion of an interventional device, wherein the optical fiber comprises at least one outer fiber core disposed at a non-zero radial distance from a longitudinal center axis of the optical fiber and/or at a non-zero radial distance from a longitudinal center axis of the interventional device, and wherein the at least one outer fiber core is extending along the longitudinal center axis of the optical fiber and having at least one strain sensor adapted to generate strain-based shape sensing data of the optical fiber, the method comprising:
  i. obtaining, from the at least one strain sensor, strain-based shape sensing data of the optical fiber;
  ii. correcting, by a shape sensing system, the strain-based shape sensing data with a strain correction term to obtain a corrected strain-based shape sensing data;
  iii. calculating, by the shape sensing system, a strain-based reconstructed shape of the optical fiber based on the corrected strain-based shape sensing data; and
  iv. mapping the strain-based reconstructed shape of the optical fiber in a first coordinate system to obtain a mapped strain-based reconstructed shape;
wherein the strain correction term is a predetermined strain correction term derived from a step of comparing a previous strain-based reconstructed shape of the optical fiber with additional information related to the shape of the optical fiber obtained from an additional information source other than the at least one strain sensor,
wherein following mapping the strain-based reconstructed shape in the first coordinate system, the method comprises obtaining a new set of the additional information related to the shape of the optical fiber and updating the predetermined strain correction term based on comparing the mapped strain-based reconstructed shape of the optical fiber with a reconstructed shape of the optical fiber based on the new set of the additional information in the first coordinate system.

2. The method for shape sensing an optical fiber according to claim 1, wherein comparing the mapped strain-based reconstructed shape of the optical fiber is based on varying the predetermined strain correction term to minimize a shape difference between the strain-based reconstructed shape of the optical fiber and the reconstructed shape of the optical fiber based on the additional shape information in the first coordinate system.

3. The method for shape sensing an optical fiber according to claim 1, wherein updating the predetermined strain correction term is performed at a predetermined time interval.

4. The method for shape sensing an optical fiber according to claim 1, further comprising:
- selecting the most recent additional information generated by the additional information source;
- comparing the mapped strain-based reconstructed shape of the optical fiber with a reconstructed shape of the optical fiber based on the additional shape information in the first coordinate system; and
- updating the predetermined strain correction term based on comparing the mapped strain-based reconstructed shape of the optical fiber with the reconstructed shape of the optical fiber.

5. The method for shape sensing an optical fiber according to claim 4, wherein comparing the mapped strain-based reconstructed shape of the optical fiber with the reconstructed shape of the optical fiber based on the additional shape information in the first coordinate system is based on varying the predetermined strain correction term to minimize a shape difference between the strain-based reconstructed shape of the optical fiber and the reconstructed shape of the optical fiber based on the additional shape information in the first coordinate system.

6. The method for shape sensing an optical fiber according to claim 1, wherein the strain correction term comprises a twist induced strain correction term representing a dynamically variable twist applied on the optical fiber.

7. The method for shape sensing an optical fiber according to claim 1, wherein the optical fiber further comprises a central fiber core disposed along the longitudinal center axis of the optical fiber and having at least one strain sensor adapted to provide strain-based shape sensing data of the optical fiber.

8. The method for shape sensing an optical fiber according to claim 1, wherein the optical fiber further comprises at least one tracking sensor adapted to provide additional position information in relation to a position of the optical fiber information in the first coordinate system.

9. The method for shape sensing an optical fiber according to claim 1, wherein the strain-based reconstructed shape of the optical fiber is based on bend induced strain data from which a curvature and a bending angle of at least a portion of the optical fiber is derived, wherein the bend induced strain data is corrected by a twist induced strain correction term.

10. The method for shape sensing an optical fiber according to claim 1, wherein the additional information source is obtained from an imaging device, a sensor other than a strain sensor or a model of the interventional device.

11. The method for shape sensing an optical fiber according to claim 10, wherein the additional information source is a fluoroscopic image source, a preoperative model computed tomography scan source, a magnetic resonance image source, a kinematic model source, a dynamic model source, an electromagnetic tracking system source, or another image derivable shape/pose data source.

12. The method for shape sensing an optical fiber according to claim 1, wherein the at least one strain sensor is selected from the group consisting of an FBG sensor and an impedance strain sensor.

13. The method for shape sensing an optical fiber according to claim 1, further comprising the steps of:
   determining a calibration relationship between the first coordinate system and a second coordinate system of an additional data source; and
   mapping the additional information from the additional data source in the first coordinate system using the calibration relationship.

14. A shape sensing system configured to perform a method for shape sensing an optical fiber embedded within at least a portion of an interventional device according to claim 1, wherein the optical fiber comprises at least one outer fiber core disposed at a non-zero radial distance from a longitudinal center axis of the optical fiber and/or at a non-zero radial distance from a longitudinal center axis of the interventional device, wherein the at least one outer fiber core is extending along the longitudinal center axis of the optical fiber, and wherein the at least one outer fiber core has at least one strain sensor adapted to generate strain-based shape sensing data of the optical fiber, the shape sensing system comprising:
   a strain measuring unit in communication with the optical fiber and configured to obtain, from the at least one strain sensor, strain-based shape sensing data of the optical fiber;
   a data processing and memory unit in communication with the strain measuring unit and configured to at least correct the strain-based shape sensing data with a strain correction term, calculate a strain-based reconstructed shape of the optical fiber based on the corrected strain-based shape sensing data, and map the strain-based reconstructed shape of the optical fiber in a first coordinate system; and
   an additional information source other than the at least one strain sensor, wherein the additional information source is in communication with the data processing and memory unit.

15. An interventional device, comprising:
   an elongate body having a longitudinal center axis;
   an optical fiber embedded within at least a portion of the elongate body; and
   the shape sensing system of claim 14;
   wherein the optical fiber comprises at least one outer fiber core extending along a longitudinal center axis of the optical fiber and disposed at one or more of:
      a non-zero radial distance from the longitudinal center axis of the optical fiber, and
      a non-zero radial distance from a longitudinal center axis of the interventional device;
   wherein the at least one outer fiber core comprises at least one strain sensor configured to generate strain-based shape sensing data of the optical fiber; and
   wherein the at least one strain sensor is operably coupled to the strain measuring unit of the shape sensing system.

16. The interventional device of claim 15, wherein the elongate body is a catheter.

17. The method for shape sensing an optical fiber according to claim 1, wherein the optical fiber further comprises an electromagnetic tracking sensor configured to provide tracking data in relation to a position of the optical fiber in the first coordinate system.

18. A method for shape sensing an optical fiber embedded within at least a portion of an interventional device, wherein the optical fiber comprises at least one outer fiber core disposed at a non-zero radial distance from a longitudinal center axis of the optical fiber and/or at a non-zero radial distance from a longitudinal center axis of the interventional device, and wherein the at least one outer fiber core is extending along the longitudinal center axis of the optical fiber and having at least one strain sensor adapted to generate strain-based shape sensing data of the optical fiber, the method comprising:
   i. obtaining, from the at least one strain sensor, strain-based shape sensing data of the optical fiber;
   ii. correcting, by a shape sensing system, the strain-based shape sensing data with a strain correction term to obtain a corrected strain-based shape sensing data;
   iii. calculating, by the shape sensing system, a strain-based reconstructed shape of the optical fiber based on the corrected strain-based shape sensing data; and
   iv. mapping the strain-based reconstructed shape of the optical fiber in a first coordinate system to obtain a mapped strain-based reconstructed shape;
   wherein the strain correction term is a predetermined strain correction term derived from a step of comparing a previous strain-based reconstructed shape of the optical fiber with additional information related to the shape of the optical fiber obtained from an additional information source other than the at least one strain sensor,
   wherein following mapping the strain-based reconstructed shape in the first coordinate system, the method further comprises performing the steps i.-iv. on the basis of the predetermined strain correction term that was utilized in a previous step of correcting the strain-based shape sensing data until a new set of the additional information related to the shape of the optical fiber is obtained, the method further comprising updating the predetermined strain correction term based on comparing the mapped strain-based reconstructed shape of the optical fiber with a reconstructed shape of the optical fiber based on the new set of the additional information in the first coordinate system.

* * * * *